US007260558B1

(12) United States Patent
Cheng et al.

(10) Patent No.: US 7,260,558 B1
(45) Date of Patent: Aug. 21, 2007

(54) SIMULTANEOUSLY SEARCHING FOR A PLURALITY OF PATTERNS DEFINABLE BY COMPLEX EXPRESSIONS, AND EFFICIENTLY GENERATING DATA FOR SUCH SEARCHING

(75) Inventors: Paul C. Cheng, Cupertino, CA (US); Fangli Chien, San Jose, CA (US)

(73) Assignee: Hi/fn, Inc., Los Gatos, CA (US)

( * ) Notice: Subject to any disclaimer, the term of this patent is extended or adjusted under 35 U.S.C. 154(b) by 0 days.

(21) Appl. No.: 11/257,485

(22) Filed: Oct. 24, 2005

Related U.S. Application Data

(60) Provisional application No. 60/622,432, filed on Oct. 25, 2004.

(51) Int. Cl.
*G06N 5/00* (2006.01)
(52) U.S. Cl. ............... 706/12; 706/45; 709/230; 712/18; 717/114
(58) Field of Classification Search .......... 706/12, 706/45; 716/7; 375/143; 370/392; 382/220; 712/18; 709/230; 717/114
See application file for complete search history.

(56) References Cited

U.S. PATENT DOCUMENTS

| 5,014,327 | A  | * | 5/1991 | Potter et al. ............ 382/220 |
| 6,212,184 | B1 | * | 4/2001 | Venkatachary et al. ..... 370/392 |
| 6,421,372 | B1 | * | 7/2002 | Bierly et al. ............ 375/143 |
| 6,446,243 | B1 | * | 9/2002 | Huang et al. ............ 716/7 |
| 6,691,301 | B2 | * | 2/2004 | Bowen ................... 717/114 |
| 6,944,670 | B2 | * | 9/2005 | Krichevski et al. ....... 709/230 |
| 7,100,020 | B1 | * | 8/2006 | Brightman et al. ........ 712/18 |

FOREIGN PATENT DOCUMENTS

WO WO 2004/081761 A2 9/2004

OTHER PUBLICATIONS

M. Crochemore and T. Lecroq. "Pattern Matching and Text Compression Algorithms." ACM Computing Surveys, vol. 28, No. 1, pp. 39-41, 1996.
Satoru Takabayashi. "Writing Assistance through Search Techniques." Master's Thesis, Department of Information Processing, Graduate School of Information Science, Nara Institute of Science and Technology, Feb. 9, 2001.
G. Navarro and M. Raffinot. "Fast and Flexible String Matching by Combining Bit-parallelism and Suffix Automata." ACM Journal of Experimental Algoritmics (JEA), vol. 5, No. 4, 2000.

(Continued)

*Primary Examiner*—Wilbert L. Starks, Jr.
(74) *Attorney, Agent, or Firm*—Dov Rosenfeld; Inventek

(57) ABSTRACT

An apparatus, a carrier medium carrying computer readable code to implement a method, and a method for searching for a plurality of patterns definable by complex expressions, and further, for efficiently generating data for such searching. One method includes accepting or determining a plurality of state machines for searching for a plurality of patterns, merging the state machines to form a merged state machine, and storing a data structure describing the merged state machine, including state data on the states of the merged state machine. The method is such that pattern matching logic reading state data and accepting a sequence of inputs can search the input sequence for the plurality of patterns.

48 Claims, 20 Drawing Sheets

OTHER PUBLICATIONS

C.J. Coit, S. Staniford and J. McAlerney. "Towards Faster String Matching for Intrusion Detection or Exceedings the Speed of Snort." Proceedings of the 2nd DARPA Information Survivability Conference and Exposition (DISCEX II). 2001.

A. Aho and M. Corasick. "Efficient String Matching: An Aid to Bibliographic Search." Communications of the ACM, vol. 18, No. 6, pp. 333-343, Jun. 1975.

R.S. Boyer and J.S. Moore. "A Fast String Searching Algorithm." Communication of the ACM, vol. 20, No. 10, pp. 762-772, Oct. 1977.

C. Charras and T. Lecroq. "Handbook of Exact String Matching Algorithms." King's College London Publications, 2004.

Dan Gusfield, "Algorithms on Strings, Trees, and Sequences: Computer Science and Computational Biology," Cambridge University Press; Chapters 5 and 7, 1997.

\* cited by examiner

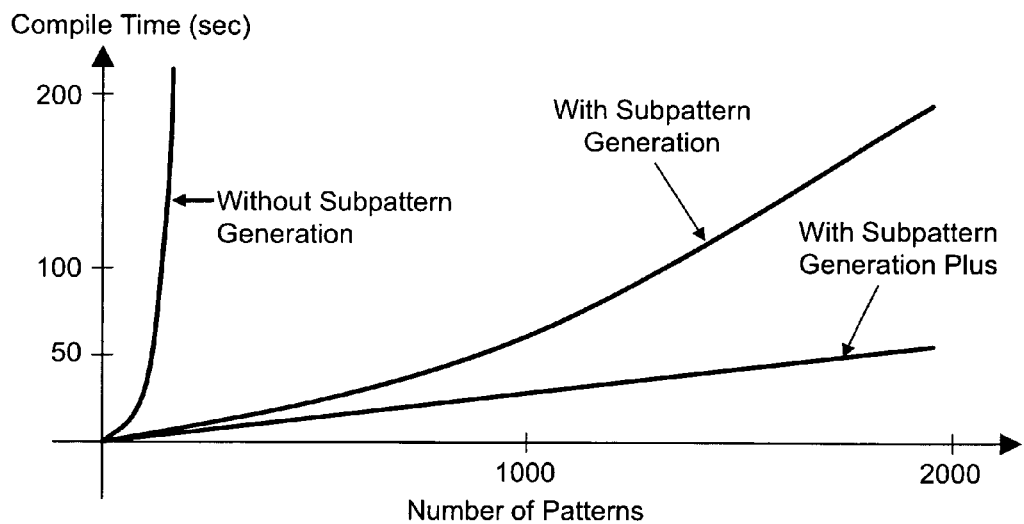
FIG. 16 Compile Time Growth Rate
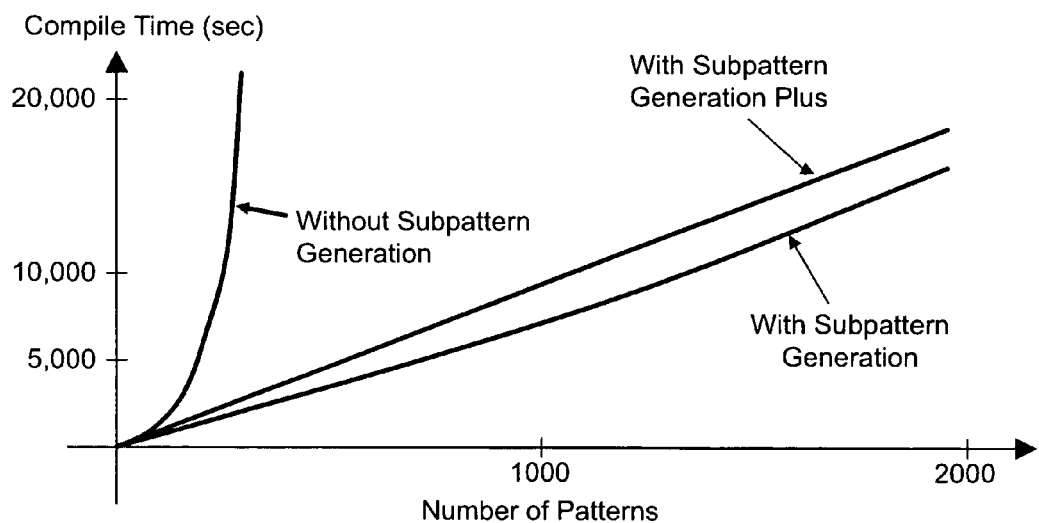
FIG. 17 State Size Growth Rate

```
int *differences( int array_1[], int array_2[], int length)
{
        int *diff_array;
        int i;

/* Create an integer array of size length */
        diff_array = (int *) malloc(sizeof(int)*length);

i = 0;
        while (i < length)
        {
                if (array_1[i] != array_2[i])
                        diff_array[i] = 1;
                else
                        diff_array[i] = 0;
                i = i + 1;
        }
        return diff_array;
}
```

FIG. 24

SIMULTANEOUSLY SEARCHING FOR A PLURALITY OF PATTERNS DEFINABLE BY COMPLEX EXPRESSIONS, AND EFFICIENTLY GENERATING DATA FOR SUCH SEARCHING

RELATED PATENT APPLICATIONS

The present invention claims benefit of U.S. Provisional Patent Application Ser. No. 60/622,432 filed Oct. 25, 2004 to inventors Cheng et al., titled SIMULTANEOUSLY SEARCHING FOR A PLURALITY OF PATTERNS DEFINABLE BY COMPLEX EXPRESSIONS, AND EFFICIENTLY GENERATING DATA FOR SUCH SEARCHING. The contents of such U.S. Provisional Patent Application Ser. No. 60/622,432 are incorporated herein by reference.

FIELD OF THE INVENTION

The present invention is related to searching for patterns definable by expressions that may be relatively complicated, and in particular to a method and apparatus for simultaneously searching data transmitted over a packet network for a plurality of patterns definable by expressions that may be relatively complicated.

BACKGROUND

The Need for Pattern Matching and Searching in Networks

Computer networks, such as local area networks, wide area networks, and internetworks such as the Internet are common. As organizations adopt and increase network usage, the number of applications and demands placed upon network functionality increases. Accordingly, much effort in the art has been devoted to producing more efficient ways to process the ever-increasing amount of information transmitted over computer networks.

Data that is transmitted over a network is typically broken up into one or more discrete packets of data. Nodes of a computer network, e.g., routers, switches, firewalls, aggregators, and so forth, perform complex data analysis and management on these packets. It is these network nodes that typically have increasing demands placed upon them, and that require new inventive methods to keep up with the ever-increasing flow of network traffic.

One operation required in such nodes is the searching for specific patterns in the packets.

Network data analysis often involves scanning, processing or mining network data for useful information. For the simplest analysis problems, the standards according to which networks are designed provide a useful description, e.g., a map, for some information contained in network traffic. For example, many methods have been developed to scan network traffic for information by looking up packet headers, e.g., MAC addresses, IP addresses, TCP port numbers, and so forth. As a result, a number of early network analysis methods and products based thereon have been developed using simple, fixed-length pattern scanning techniques.

More complex network analysis problems require processing a plurality of packets that are related to each other. Such analysis is typically required when one wishes to analyze traffic at a higher level. For example, higher level network traffic analysis is required to perform packet classification, protocol analysis, URL address lookup, payload content inspection, virus signature scanning, intrusion detection, stateful firewall rule matching, load balancer rule matching, and so forth. Further, such higher-level analysis sometimes requires more complicated searching functionality than simple field lookups according to a network standard.

Pattern Matching and Searching Methods

Searching an input, e.g., a network data stream, for a simple sequence of inputs is well known in the art. The inputs in general are called "characters" of an "alphabet." For example, an input may be an octet of the alphabet of all possible octets. Alphabetical characters are used herein to describe inputs only for the sake of explanation, and also because searching for text patterns is common. For example, a simple sequential character-searching problem might be trying to find if and where the sequence "cab" appears in the input "abacab." Some methods of the art for solving such a problem include the Knuth-Morris-Pratt method (D. E Knuth, J. H. Morris Jr., V. R. Pratt: Fast pattern matching in strings, *SIAM Journal on Computing*, vol. 6, no. 1, pp. 323-350, 1977), the Aho & Corasick method (A. Aho, and B. Corasick: Efficient string matching: An aid to bibliographic search, *Commun. the ACM*, vol. 18, no. 6, pp. 333-343. 1975), the Rabin-Karp method (Richard Karp and Michael Rabin: Efficient randomized pattern-matching algorithms, *IBM J. Res. Develop.*, vol. 31, no. 2, pp. 249-260, 1987), and the Boyer-Moore method (R. S. Boyer, J. S. Moore: A fast string searching algorithm, *Comm. ACM*, vol. 20, pp. 62-72, 1977).

Searching an input for a more complicated pattern of inputs, e.g., pattern matching, is also well known in the art. For example, one may wish to find all string sequences starting with "a" followed by at least one "b" in the input "cbaabbcaba." Such a problem can be more generally described as finding certain input sequences, e.g., a pattern, in another sequence of inputs.

Regular Expressions

Pattern matching typically involves the use of a pattern description language, e.g., a grammar, to describe the pattern and then a method to transform an expression in the language to a state machine that will run with an input that may contain the pattern. For example, one popular pattern description language is known as the language of Regular Expressions. See, for example, Jeffrey E. F. Friedl, Andy Oram, Mastering Regular Expressions, 2nd Edition, O'Reilly, 2002. See also the online guide at called "Regular Expressions", part of The Single UNIX® Specification, Version 2, from The Open Group, available at http://www.opengroup.org/onlinepubs/007908799/xbd/re.html (valid on Oct. 17, 2004).

While those skilled in the art would be familiar with regular expressions, a brief introduction is provided herewith for completeness. Regular expressions are useful because they can express complicated patterns using only a relatively small number of characters. For example all string sequences starting with "a" followed by at least one "b" can be represented as "ab+." See Table 1 for a short list of some regular expression rules and Table 2 for some examples of regular expressions.

TABLE 1

Some Regular Expression Rules

| | |
|---|---|
| . | Match any character |
| * | Match the preceding occurring at least one time, or no times |
| + | Match the preceding 1 or more times |
| A\|B | Match A or B |
| (A) | Match just A (often used in conjunction with \|) |
| [list] | Match a character, only if it is in list |
| [^list] | Match a character, only if it is not in list |

TABLE 2

Some Regular Expression Examples

| | |
|---|---|
| .*abc | Matches "89abc", "abc" but not "89abd" |
| a(b\|c) | Matches "ab", "ac", but not "ax" |
| A*B+ | Matches "AABB", "AB", but not "AA" |
| b[0,5]c | Matches "b0c", "b4c", but not "b9c" or "bc" |

State Machines and Finite Automata for Regular Expressions

It is well known to those in the art to use state machines to search for patterns, e.g., patterns expressed by regular expressions. Those in the art also know that finite automata theory can be used to abstractly describe state machines that search for patterns expressed by regular expressions. According to finite automata theory, a state machine is a limited abstract computing device that finds in an input the pattern(s) described by the state machine description. A state machine includes a finite set of states and an alphabet, e.g., a set of one or more inputs. There is one start state, e.g., state zero, and at least one final state defined as a state that produces a "hit," called a hit state herein, and meaning that a pattern was found. Each state has one or more paths that point to any state of the set of states, e.g., another state or the same state. Each path is associated with an input from the alphabet of inputs.

When processing an input, e.g., a sequence of at least one input from the alphabet of possible inputs, a state machine starts in the start state. As the state machine reads each input, it moves to the next state defined by the path associated with the input. By some conventions, if there is no path associated with the input, the state machine moves to a special error state that indicates, e.g., that the pattern represented by the state machine does not exist in the sequence of inputs. By other conventions, every state must have a path associated with every possible input of the alphabet of inputs. If the state machine moves to a hit state, then this indicates a match, e.g., the pattern represented by the state machine description exists in the input. If the state machine reaches the end of the sequence of inputs without moving to a final state, then this indicates no match, e.g., the pattern represented by the state machine description does not exist in the sequence of inputs.

Deterministic Finite Automata (DFAs) and Non-Deterministic Finite Automata (NFAs)

It is known in finite automata theory to classify a state machine into one of two general classifications: deterministic finite automata (DFAs) and non-deterministic finite automata (NFAs). DFAs are state machines wherein each path of a given state is uniquely associated with an input of the alphabet. In other words, for a particular state, there cannot be two paths associated with the same input. Thus, for DFAs, the computational time complexity for processing an input has an upper bound, e.g., the computational time complexity is O(n) where n is the length of the sequence of inputs. Although generating a DFA from a regular expression, e.g., compiling a DFA from a regular expression requires additional computation, using the resulting DFA state machine with any input is in general very efficient.

NFAs are state machines that differ from DFAs in several ways. First, NFAs have no uniqueness restriction applied to paths, e.g., for any particular state, two or more paths may be associated with the same input from the alphabet of inputs, i.e., an NFA can have multiple paths from the same state, each path associated with the same input. Furthermore, NFAs allow what are called "null" paths or transitions. Such paths are represented as being associated with a special character $\epsilon$ that represents such a "null" path. A null path does not consume an input character; it represents a spontaneous transition without consuming an input. Additionally, when an NFA is used to process an input, a particular state that has null and non-null paths can transition via any one of the null paths, or via any one of the non-null paths associated with the current input. That is, when in a first state and processing an input for which there are a plurality of paths, if a particular chosen path does not lead to a match state, the NFA returns to that first, i.e. the previous state, and tries another possible path associated with that input. Thus, for NFAs, the computational time complexity for processing an input can be exponential, e.g., the computational time complexity can be $O(c^n)$ where n is the number of inputs and c an integer greater than 1. Typically, generating an NFA description for a pattern yields a state machine with a smaller set of states than generating a DFA description from the same pattern. However, using that NFA as a state machine for a provided input leads to unpredictable computational time complexity.

Finite automata theory is well known in the art, and as a result, a number of methods have been developed and are known to transform a NFA into a DFA and a DFA into a NFA. Methods also are known for transforming a pattern such as a regular expression into a NFA for matching the pattern, and into a DFA for matching the pattern.

Overview of Some Needs in the Art

As more and more networks are used, as the speed of such networks become higher and higher, and as networks become more and more complex, there is a general need in the art for processing network traffic more efficiently. When searching for patterns, e.g., patterns described by a pattern language such as a regular expression, there is a need in the art for managing computer implemented state machines in an efficient manner usable for such searching.

For example, as regular expressions become more complicated (more complex), the number of states in a DFA or NFA can be rather large. There is a need in the art for methods to efficiently represent the states of a finite state machine that can be used for searching for a pattern describable by a regular expression. For example, there is a need in the art to represent such states and state transition information of a state machine in a compressed manner that does not require much memory. There also is a need in the art to represent such state and state transition information in a manner that provides for rapidly reading the information from memory or storage so that searching can be carried out rapidly, e.g., in real time for relatively fast networks.

While how to design a state machine that can search ("match") patterns describable by a single regular expression is known, there is a need in the art for a state machine and for a search method that can simultaneously search for a plurality of regular expressions.

It is desirable to be able to manage both patterns that are known a priori, e.g., patterns for well known protocols, for known packet formats, for known viruses, for known intrusion signatures, and so forth, and also patterns still to be discovered, e.g., patterns for new protocol and packet formats, for firewall security rules, for quality of service ("QoS") policies, for newly discovered viruses or intrusion signatures, and so forth. There is thus a need in the art to efficiently manage, e.g., iteratively manage patterns as they are developed in a pattern database in a scalable manner.

Thus, there is a need in the art for a method and apparatus to efficiently generate, e.g., compile a set of at least one pattern into a set of at least one state machines that can be processed in O(n) computational time complexity for an input of size n. Further, there is a need in the art to efficiently transform a set of at least one state machines into a pattern database usable for processing input to generate an output of possible pattern matches.

SUMMARY

Described herein are an apparatus, a carrier medium carrying computer readable code to implement a method, and a method for searching for a plurality of patterns definable by complex expressions, and further, for efficiently generating data for such searching.

Described herein, according to one aspect, is a method that includes accepting or determining a plurality of state machines for searching for a plurality of patterns describable by expressions in a pattern description language; merging the state machines to form a merged state machine; and storing a data structure describing the merged state machine, including state data on the states of the merged state machine. The method is such that pattern matching logic reading state data and accepting a sequence of inputs can search the input sequence for the plurality of patterns.

Also described herein, according to one aspect, is an apparatus that includes an input reader arranged to read each input; a state data reader arranged to read a particular state's state, state data from a pattern database; and a state decoder and lookup engine arranged to decode the state data of the state and determine actions according to the read input and the state data.

Also described herein, according to one aspect, is an apparatus that includes pattern matching logic configured to accept an input and to accept information on a present state of a state machine defined by a pattern database determined from a plurality of patterns, the pattern matching logic further configured to implement for the accepted present state the state machine defined by the pattern database, and configured to produce an output that includes any pattern match results corresponding to any matches in the input to any of the plurality of patterns. The pattern database is determined from the plurality of patterns by accepting the plurality of patterns and converting the accepted patterns into at least one pattern data structure representing at least one state machine.

Also described herein, according to one aspect, is an apparatus that includes a pattern converter configured to accept a plurality of patterns and to convert the accepted patterns into at least one pattern data structure representing at least one state machine, and a database generator coupled to the pattern converted and configured to transform the at least one data structure to a pattern database defining at least one state machine. The apparatus is such that pattern matching logic can use the pattern database to implement the at least one state machine defined by the pattern database.

Also described herein, according to one aspect, is an apparatus that includes pattern matching logic configured to accept an input, and implement at least one state machine defined by a pattern database determined from a plurality of patterns, the pattern matching logic further configured to produce an output that includes any pattern match results corresponding to any matches in the input to any of the plurality of patterns. The pattern database is determined by accepting the plurality of patterns and converting the accepted patterns into at least one pattern data structure representing the at least one state machine, and generating the pattern database from the into at least one pattern data structure.

Also described herein, according to one aspect, is a method transforming a plurality of input patterns into a pattern database. The method includes converting a plurality of patterns into at least one data structure representing at least one state machine and transforming the at least one state machine into a pattern database.

Also described herein is a carrier medium carrying computer readable code to instruct a processor to any one (or more than one) of the method embodiments described herein.

Other aspects, embodiments, and features will be clear from the description and claims herein.

BRIEF DESCRIPTION OF THE DRAWINGS

Some embodiments and aspects of the invention are provided herein with the aid of the following drawings.

FIG. 16 and FIG. 17 show performance comparisons of a prior art method compared to embodiments of two methods described herein incorporating aspects of the present invention.

FIG. 24 shows a C-language program for determining the differences between a first array and a second array denoted to produce an array that describes which elements of the first and second arrays differ. The program in FIG. 24 is used in some embodiments to build state data structures.

DETAILED DESCRIPTION

Described herein is a method to convert a plurality of patterns, e.g., patterns describable by a corresponding plurality of regular expressions, into data describing a single state machine ("state machine data") for recognizing the patterns. Also presented herein is a method to compress the data describing a single state machine into a compressed form that takes up relatively little storage, and into a form that provides for fast reading of the state machine data, e.g., reading the state machine data in a fixed relatively small number of memory accesses.

While in the description herein, each pattern is represented in the syntax of a regular expression, in alternate embodiments, an alternate language, e.g., an alternate syntax capable of representing relatively complex patterns may be used, and how to modify the description herein to accommodate such other language would be clear to those in the art.

Figure 1:
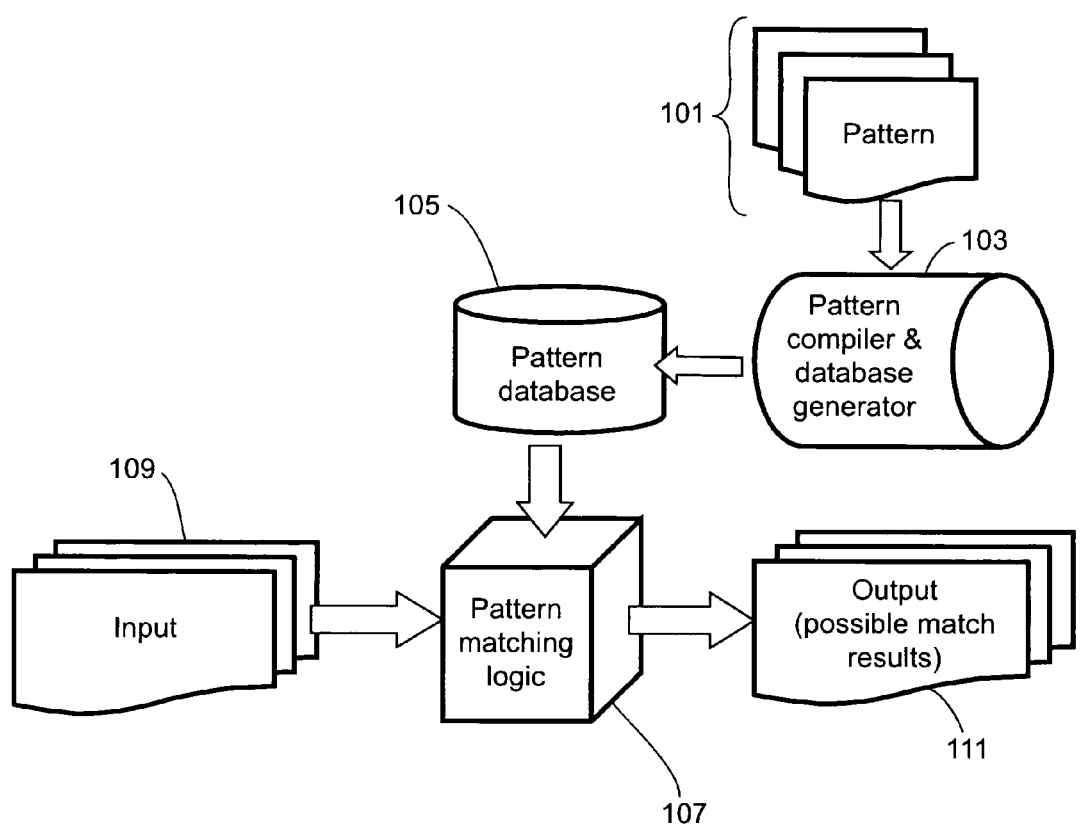
FIG. 1 shows a data flow diagram of one embodiment that incorporates aspects of the present invention and that includes a pattern compiler, a database generator, and pattern matching logic.

FIG. 1 shows a data flow diagram including a pattern compiler, a database generator, and pattern matching logic according to aspects of the present invention. A plurality of patterns 101 is provided to a pattern-to-pattern data converter ("pattern converter") 103. In one embodiment, the pattern converter is a pattern compiler.

In one embodiment, the pattern converter 103 is implemented as a program running on a general purpose CPU (computer processing unit). The pattern converter 103 converts the patterns 101 into at least one pattern data structure representing at least one state machine: a DFA in one embodiment.

One aspect of the present invention is the ability to work with a plurality of input patterns, and therefore, in most of this description it is assumed that there is a plurality of patterns. Those skilled in the art would understand however, that a pattern converter designed to accept a plurality of patterns and convert them to a data structure would also work when there is only one input pattern, and would convert such a pattern into a pattern data structure.

Similarly, while in most of the description herein, it is assumed that the plurality of input patterns is converted into the data structure(s) for a single state machine, those in the art will understand that it may be advantageous to use aspects of the present invention to convert a very large number of patterns into one or more data structures describing more than one state machine, e.g., a very small number of state machines.

In 103, the (at least one) data structure representing typically one state machine is transformed into a pattern database 105 defining at least one state machine and usable by pattern matching logic 107.

The pattern matching logic 107 sets up at least one process or thread to implement the state machine (in general, the at least one state machine) defined by the pattern database 105. The at least one process or thread executing includes the pattern matching logic reading an input 109, and producing an output that may have pattern match results 111 according to the state machine or machines.

In one embodiment, the pattern database describing the state machine(s) is included in a file. In an alternate embodiment, the pattern database is included in a memory, e.g., in SRAM, or DRAM or other memory.

In one embodiment, the input 109 is in a file stored in a memory or on a computer disk. In another embodiment, the input 109 is in a packet or a subset of a packet transmitted or for transmission over a computer network, e.g., in a packet obtained at a node of the network by a packet acquisition device.

In one embodiment, the pattern matching logic 107 is implemented as code executable on a programmable processor. Examples of a programmable processor include a network processor, a microprocessor, a core implementing a processor for inclusion in a chip, and a DSP device. In another embodiment, the pattern matching logic 107 is implemented as special purpose hardware. In yet another embodiment, logic 107 is in the form of an ASIC (application specific integrated circuit), and in yet another embodiment, logic 107 is in the form of a FPGA (field programmable gate array).

While in one embodiment, a single process or thread is used to implement the at least one state machine defined in the pattern database, in an alternate embodiment, a plurality of processes and/or threads are used to implement a plurality of state machines defined in the pattern database.

The pattern match results 111 can be processed by the pattern matching logic or handled by another process. In one embodiment, the pattern match results are stored in memory. In another embodiment, the pattern match results are included in a network communication for processing by another node of a network.

Figure 2:
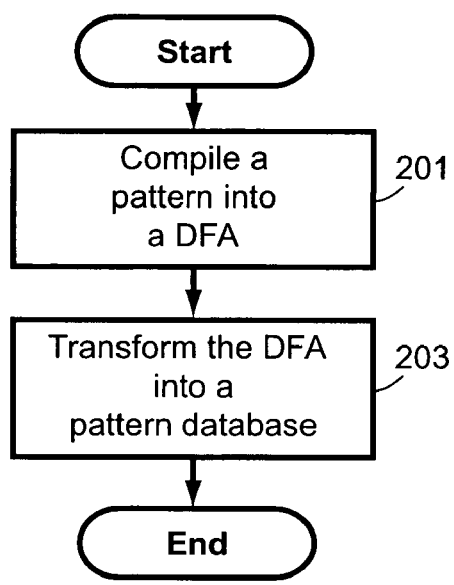
FIG. 2 shows a flowchart describing one embodiment of a method of transforming a plurality of patterns—in general, at least one pattern—into a pattern database.

FIG. 2 shows a simplified flowchart of a method embodiment of transforming a plurality of input patterns into a pattern database. In one embodiment, the pattern converter and database generator 103 of FIG. 1 implements such a method. The method includes in 201 converting, e.g., compiling the plurality of patterns 101 into a data structure representing a DFA, e.g., a state machine. In 203, the DFA is transformed into a pattern database, e.g., the pattern database 105 of FIG. 1.

The flowchart of FIG. 2 may be generalized into a pattern converting method that converts the patterns 101 into a plurality of DFAs, typically a relatively small number of DFAs. How to so modify the flow chart of FIG. 2 would be straightforward to those in the art.

Figure 3:
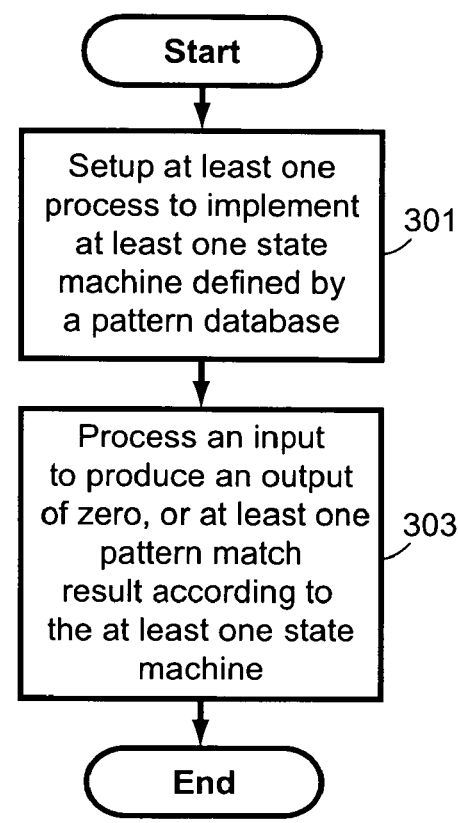
FIG. 3 shows a flowchart describing one embodiment of a method that reads an input to produce an output of pattern match results using a pattern database containing data for at least one state machine.

FIG. 3 shows a simplified flowchart of a method embodiment that reads an input to produce an output of pattern match results according to a pattern database including at least one state machine. In one embodiment, the pattern matching logic 107 of FIG. 1 is arranged to execute such a method. The method includes in 301 setting up at least one process or thread to implement at least one state machine defined by a pattern database, e.g., the pattern database 105 of FIG. 1. In 303, the method starts the at least one process or thread to read an input to produce an output of zero, or one or more pattern match results according to the at least one state machine.

Pattern Converting

Figure 4:
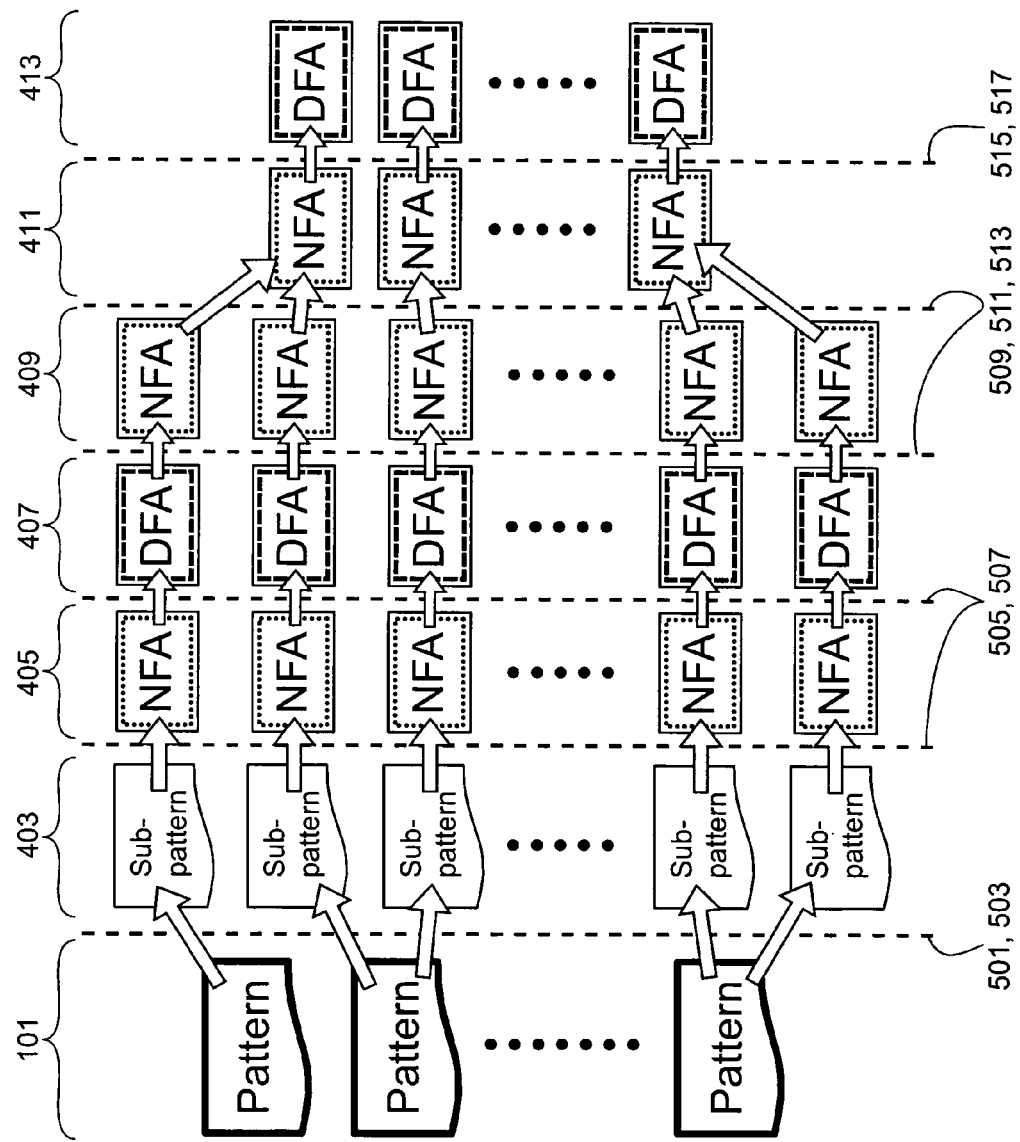
FIG. 4 shows a data flow diagram of one embodiment showing how at least one pattern—typically a plurality of patterns—is transformed into at least one state machine represented in a pattern database.

FIG. 4 shows a data flow diagram of one method embodiment of the pattern converting 201 of FIG. 2. The method embodiment shown includes transforming the plurality of patterns 101 into at least one—typically exactly one—state machine for inclusion in a pattern database.

Figure 5A:
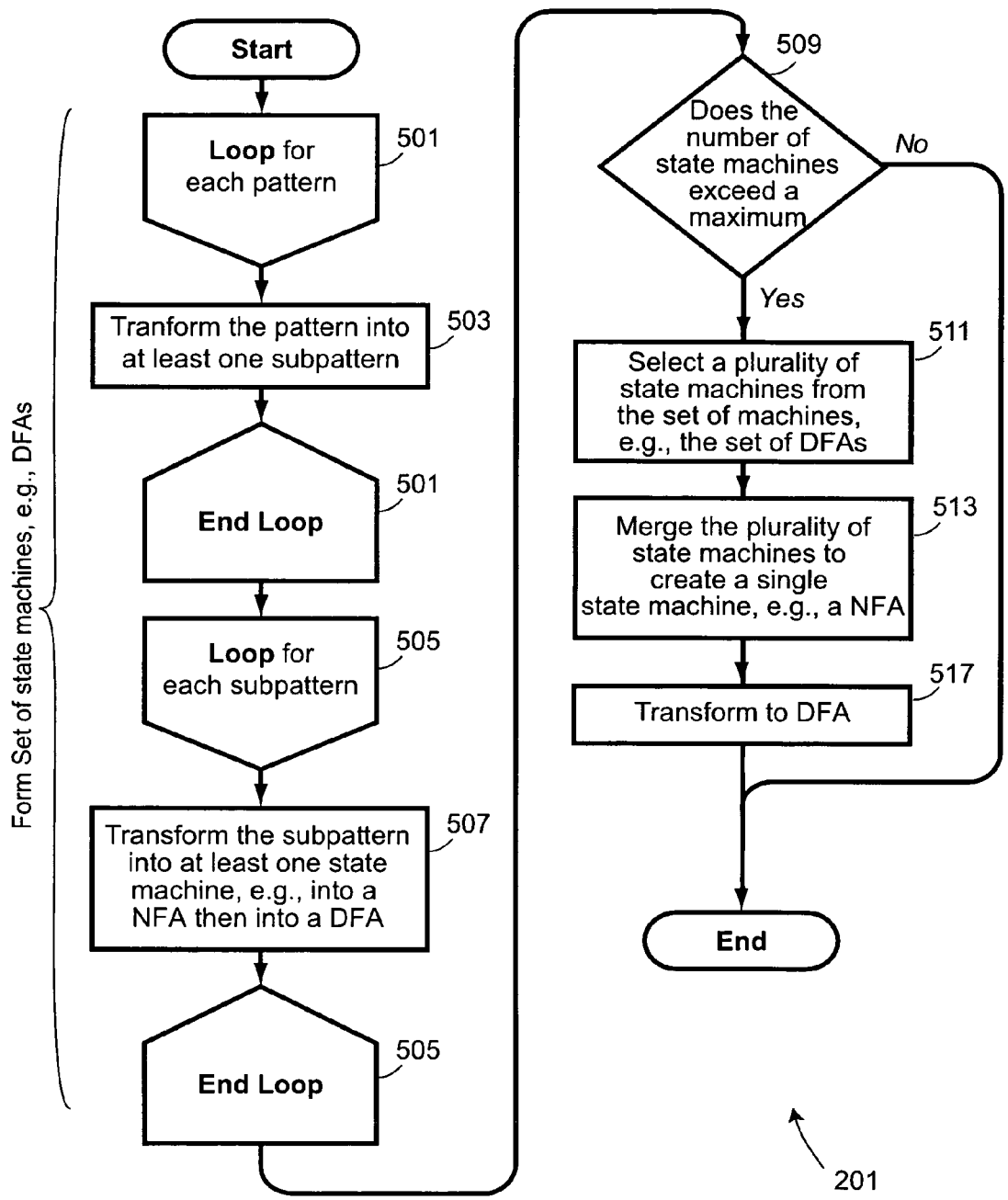
FIGS. 5A and 5B each shows a flowchart of alternate method embodiments of transforming at least one pattern—typically a plurality of patterns—into at least one DFA, i.e., at least one state machine.
Figure 5B:
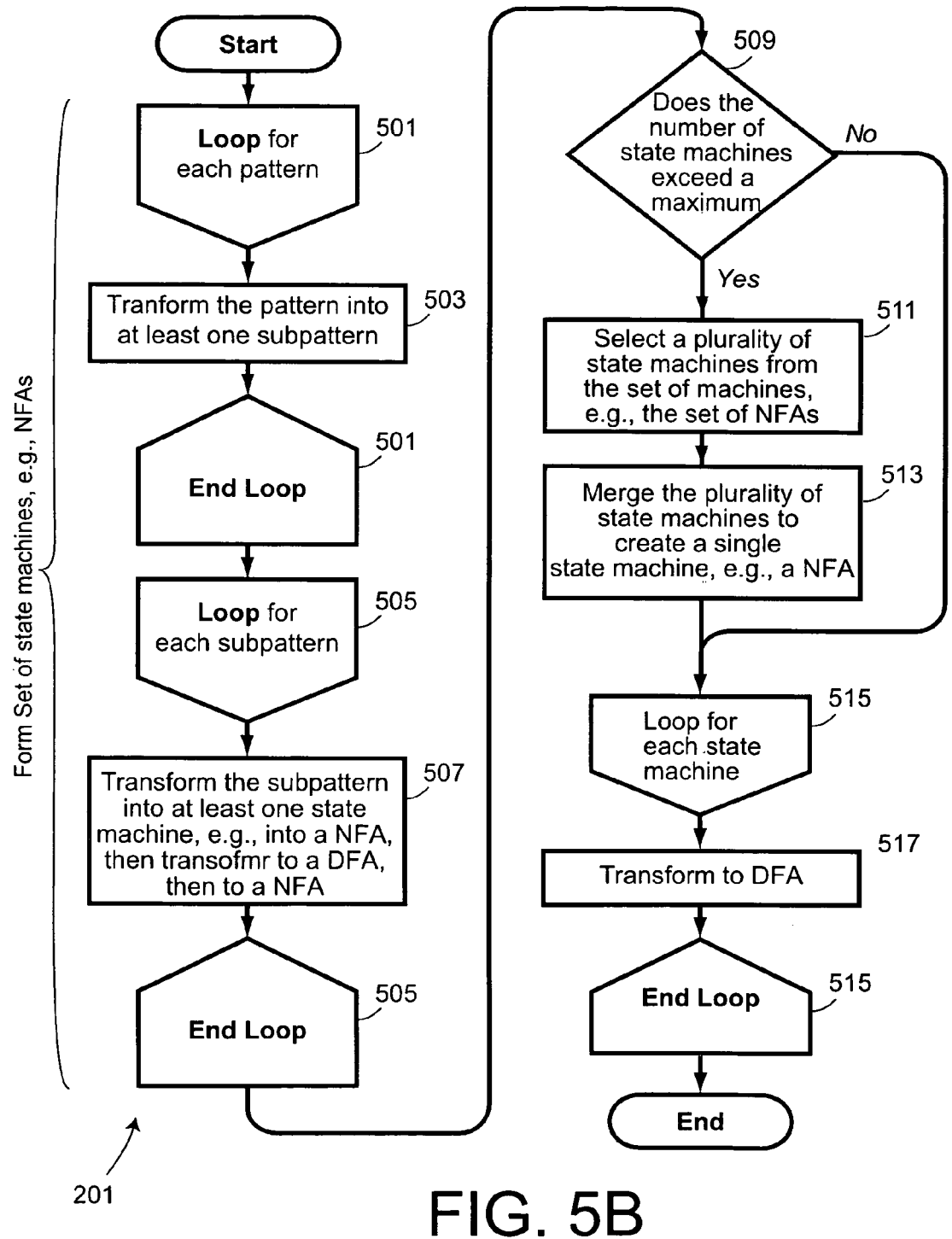

FIGS. 5A and 5B each shows a flowchart of alternate method embodiments that implements the data converting 201 of FIG. 2.

The inventors have found that by splitting a pattern into at least one possibly simpler subpattern, the number of states is decreased compared to the number that would be created without splitting a pattern into at least one subpattern. In addition, the computational time complexity for compiling the at least one pattern into a pattern database, e.g., for flowchart blocks 201 and 203 of FIG. 2, is then typically substantially lower when performing subpattern generation.

According to method embodiments illustrated in FIG. 4, using the flow chart of either FIG. 5A or FIG. 5B, a loop 501 is performed for each pattern of at least one pattern provided for compilation.

A data structure in memory represents each pattern and includes a unique pattern ID that is used by pattern matching logic, e.g., by device 107 of FIG. 1, to determine which pattern of the patterns 101 generated a match. The term hit ID is used herein to identify the pattern and is synonymous with the term pattern ID. In one embodiment, the pattern ID is a 32-bit number. In a particular embodiment, the pattern ID is a 32-bit index used to point to a particular pattern of the set of patterns 101, so that the pattern ID is the 32-bit pattern index for the set of input patterns. For example, suppose there are four input patterns. In one version, these form a list of the first, second, third and fourth patterns, and the pattern ID 0 is of the first pattern, pattern ID 1 is of the second pattern, the third pattern has a pattern ID (Hit ID) of 2, and so forth. In another embodiment, a set of patterns is pre-defined, e.g., a superset of any likely set of input patterns. Each pattern ID is then a pointer to a pattern of the superset of patterns. For example, suppose again there are four patterns, and suppose there is a set of 2048 patterns. As an example, the four input patterns might then have pattern IDs 237, 573, 875, and 1654.

With each loop, the method performs block 503 of the respective flowchart (FIG. 5A or 5B) where the pattern of the at least one pattern 101 is transformed into at least one subpattern which includes a subpattern ID field to identify the subpattern. As described below, this field may include a pattern ID to identify the pattern from which the subpattern is generated, and further information to determine the actual matched subpattern. The looping of 503 results in a set of at least one subpattern 403.

The details of one embodiment of splitting a pattern into at least one subpattern and of one embodiment of generating subpattern ID fields are described in more detail herein below in the subsection "Subpattern Generation."

The subpattern ID field is used by methods performing result processing on pattern match results to determine the pattern that generated the pattern match.

A subpattern ID field that is associated with a subpattern that is included in any data structures is generated from information provided by the subpattern. In particular, aspects of the invention provide a subpattern ID field to be included in the data structures representing states of NFAs or DFAs, and the compressed data structures representing states for inclusion into a pattern database.

A loop 505 includes in 507 transforming each subpattern into a state machine, such that a set of state machines is formed. In one embodiment shown in FIG. 5A, each subpattern is transformed into a NFA, while in another embodiment shown in FIG. 5B, each subpattern is transformed into a DFA in 507.

In a step 513, a selected plurality of the formed state machines is merged to create a single state machine, e.g., a single DFA. The inventors have found that transforming the NFA of each subpattern, that is, each of the set 405 of NFAs into a DFA prior to the merging 513 results in a more efficiently represented state machine, e.g., a state machine with a smaller number of states, than directly merging the NFAs of each subpattern. Thus, in the version of FIG. 5A, each subpattern is transformed into a DFA in 507 of loop 505 such that the end of loop 505 is a set 407 of DFAs. Then in 513, these DFAs are merged into a single state machine. In the alternate version of FIG. 5B, each of the DFAs 407 are further transformed into a NFA 409, such that the merging 513 is the merging of NFAs 409 obtained from the DFAs 407.

Methods of carrying out the first transformation of a subpattern, e.g., a regular expression, into a data structure representing a state machine, e.g., a data structure representing an NFA, are well known to those in the art. Methods of carrying out the second transformation from a data structure representing an NFA into a data structure representing a DFA are also well known to those in the art. Methods of transforming a DFA into a NFA also are well known to those in the art.

One aspect of the invention is the inclusion of a subpattern ID field into each generated data structure representing the DFA of set 407. See subsection "Subpattern Generation" for more details on the subpattern ID. In one embodiment, the subpattern ID field is included in the NFA of set 409.

Another aspect of the invention is the merging of a plurality of state machines into a single state machine. This is shown in 513 in both FIGS. 5A and 5B. When generalized, this aspect is of transforming a first set of a plurality of state machines into a second set of a relatively small number—at least one—of state machines. The number of state machines in the second set is typically, although not necessarily less than the number of state machines in the first set. By reducing the number of state machines, a method implementation of pattern matching logic can process an input more efficiently, e.g., with a lower computational time complexity. In one version, a single state machine performs pattern matching for a plurality of patterns.

In the embodiment shown in FIGS. 4 and 5A, the reduction of the number of state machines includes merging a number of DFAs of the set 407 into a single NFA. This merging is described in more detail herein below in the subsection called "State Machine Merging." In the version shown, the state machine merging process occurs after the looping 505 that includes the transforming in 507 to a DFA. In one embodiment, this merging includes blocks 509, 511 and 513, and is applied to the set of data structures representing at least one DFA 407 to transform it into a possibly smaller set of data structures representing at least one NFA 411. In 517, this NFA is converted into a DFA.

Continuing with FIG. 5A, in 509, it is ascertained whether further merging is required, i.e., whether the current number of data structures representing DFAs is not yet sufficiently small. In one version, 509 includes ascertaining whether the number of resultant state machines exceeds a user-settable parameter representing a maximum number of state machines. If the current number of state machines exceeds a maximum, then blocks 511, 513, and 517 are performed to further reduce the number of state machines by a merging operation.

Continuing with FIG. 5A, in 511, at least two data structures representing DFAs are selected of the totality of DFAs. In one embodiment, 511 includes selecting two DFAs of the totality. In 513, these selected two data structures representing DFAs are merged into, and thus replaced, by a single data structure representing a single NFA that is then converted into a DFA. This merging operation is described in more detail herein below in the subsection called "State Machine Merging."

In the embodiment shown in FIG. 5B, the reduction of the number of state machines is of a number of NFAs of the set 409 that were transformed for each of the set of DFAs 407. Each such merging includes transforming the NFA into a DFA prior to the merge. The merging merges the DFAs into an NFA 411. The transforming of the merged results, the NFA 411 to the DFA 413 is carried out in a separate loop 515.

As one example of a method that follows the flow chart of FIG. 5B, consider four data structures representing NFAs denoted by A, B, C, and D, respectively. Suppose that there is a user-settable maximum number of state machines that is set to 1, such that the merging is to a single NFA. In a first loop, A and B are merged and replaced by a data structure, say a structure denoted by E that represents a state machine equivalent to state machines represented by A and B. There are now three NFA data structures. In a next loop, C and D are merged and replaced by an NFA data structure denoted by F, resulting in a total of two NFA structures. One more loop is used wherein E and F are merged and replaced by a single structure denoted G that is a representation of a state machine that is equivalent to state machines A, B, C and D combined.

Continuing with the alternate embodiment of FIG. 5B, when 509, 511, and 513 complete, a resultant set of at least one data structure representing at least one corresponding NFA 411 is obtained. In a loop 515, a block 517 is repeated for each data structure representing an NFA to transform the data structure to that of a DFA. After the loop 515 completes, a set of at least one data structures representing DFAs 413 is available, as shown in FIG. 4.

If would be clear to those skilled in the art that many different alternate configurations to those shown in FIGS. 5A and 5B are possible for the loops and operations of carrying out the transforming of the patterns into subpatterns, then into NFAs, then into DFAs, then merging the DFAs. The flow charts of FIGS. 5A and 5B are examples only, and alternate configurations are also meant to fall within the scope of the present invention.

Subpattern Generation

The block 503 of the flowchart of FIGS. 5A and 5B includes transforming a pattern into at least one subpattern, i.e., splitting the pattern. One aspect of the invention is such splitting of a pattern into one or more subpatterns. This provides state machine reduction such that the number of states is reduced such that the compiling time and database generation time carried out in 201 and 203 of FIG. 2 are reduced. For example, the reduction provides for eventual state machine optimization such that the number of states is eventually optimized.

One aspect of subpattern generation includes splitting up a pattern into subpatterns at what are called alternations— the "|" character of a regular expression used to mean "or", and splitting up each of those resultant subpatterns at multiple any matches—the ".*" sequence and the ".+" sequence in regular expressions. This splitting up can be applied once per pattern, or can be recursively applied to each resulting subpattern to yield additional time and state complexity benefits.

Figure 6:
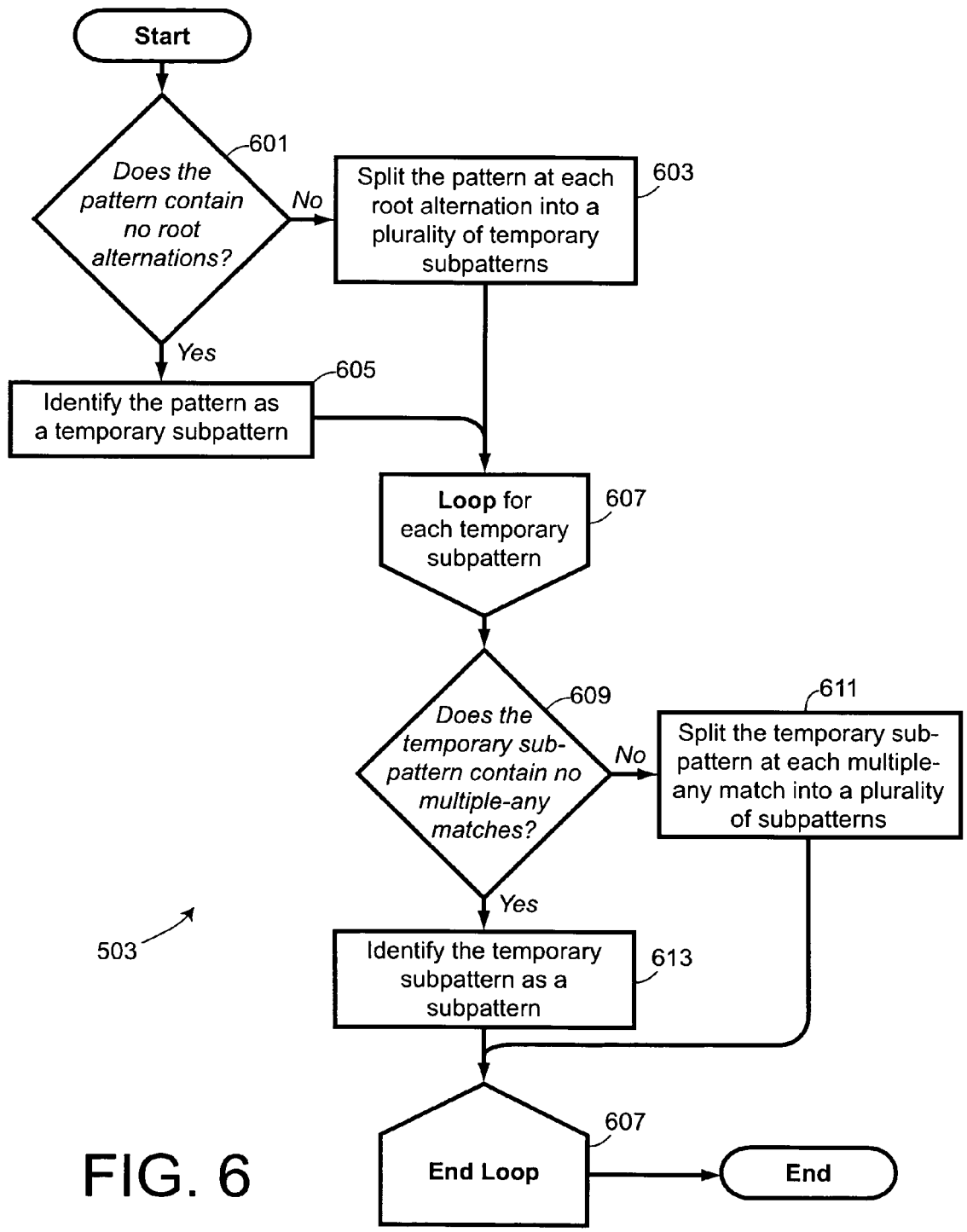
FIG. 6 shows a flowchart describing one embodiment of a method of creating at least one subpattern from a pattern described by a regular expression according to aspect(s) of the present invention.

FIG. 6 shows a flowchart describing one embodiment of a method of creating at least one subpattern from a regular expression pattern. Such a method can be used to implement block 503 of the flowchart of FIGS. 5A and 5B. Note again that although regular expressions are used to describe this embodiment, the method can generally be applied to any pattern language.

In 601, the method determines if a pattern contains any root-level alternations. By root-level alternations are meant alternations that are not nested in subsequences, e.g., in "( . . . )" sequences. For example, in the pattern "(a|b)c|d", only the second "l" just before "c" and the third "l" just before the "d' are considered root-level alternations.

If there is no root-level alternation, then 605 includes identifying the pattern as what is called herein a "temporary subpattern" for use in later operations. If there is at least one root-level alternation, then the pattern is split into one temporary subpattern plus an additional temporary subpattern for each root-level alternation. In 603, for example, the pattern "(a|b)|c|d" where there are two root-level alternations is split into 1+2=3 temporary subpatterns: "(a|b)", "c" and "d."

In a loop that includes 607, 609, and either 611 or 613, the method loops for each temporary subpattern of 603 or 605. Block 609 includes determining whether the temporary subpattern contains any root-level, non-starting multiple-any matches. By root-level, non-starting multiple-any match, it is meant that zero or more, or that one or more any character matches, e.g., ".*" or ".+", are not located at the beginning of the temporary subpattern and are not nested in subsequences, e.g., in "( . . . )" sequences. For example, in the temporary subpattern ".+(a.*)b.+c", there is just one root-level multiple-any match which lies between the "b" and the "c."

If there is no root-level, non-starting multiple-any match, 613 includes identifying the temporary subpattern as a subpattern. If there is at least one root-level, non-starting multiple-any match, then in 611 the temporary subpattern is split into one plus the number of root-level, non-starting multiple any matches. For example, the temporary subpattern ."+(a.*)b.+c" is split into subpatterns ".+(a.*)b" and ".+c."

In addition to creating at least one subpattern from a pattern, subpattern generation also includes generating a subpattern ID for use by pattern matching logic to determine the pattern ID of the pattern that is associated with a particular match from a state machine created from a subpattern.

In one embodiment, the subpattern ID field includes a pattern ID from the pattern that generated the subpattern. In the case of alternations, the subpattern ID field further includes an alternation ID that indicates the index of the subpattern in reference to, i.e., corresponding to the original pattern and its root-level alternations. The subpattern ID field further includes a multiple-any ID that indicates the index of the subpattern in reference to the original pattern and its root-level multiple-any matches. The subpattern ID field further includes a flag called a multiple-any next flag that indicates, e.g., when set to 1, whether there are any subpatterns with the same pattern ID and alternation ID that follow.

As an example, consider the exemplary pattern "(a|b).+x|c|d.*g" having (suppose) pattern ID 5. Blocks 601, 603 and 605 split the pattern into temporary subpatterns "(a|b).+x", "c" and "d.*g." Blocks 607, 609, 611 and 613 split these temporary subpatterns into subpatterns "(a|b)", ".+x", "c", "d" and ".*g." Each resulting subpattern would include a subpattern ID field. Each subpattern ID field would include a pattern ID of 5 because the original pattern that produced it had a pattern ID of 5. The subpattern ID field for "(a|b)" would include an alternation ID of 0, a multiple-any ID of 0 and a multiple-any next flag of 1. The subpattern ID field for ".+x" would include an alternation ID of 0, a multiple-any ID of 1 and a multiple-any next flag of 0. The subpattern ID field for "c" would include an alternation ID of 1, a multiple-any ID of 0 and a multiple-any next flag of 0. The subpattern ID field for "d" would include an alternation ID of 2, a multiple-any ID of 0 and a multiple-any next flag of 1. The subpattern ID field for ".*g" would include an alternation ID of 2, a multiple-any ID of 1 and a multiple-any next flag of 0.

The subpattern ID is usable by a pattern match result processing method to determine which part of the original pattern produced a match, if any. If, for example, a match occurs with a subpattern ID field including a multiple-any next flag of 1, then the method would have to wait for other matches with the same pattern ID and alternation ID before it could indicate that that there was a match against the original pattern.

State Machine Merging

Another aspect of the invention is the merging of two or more state machines into a single state machine.

As already stated above, the inventors have found that, even though each subpattern (or pattern) is converted into a NFA, there is advantage to convert the NFAs into DFAs prior to merging. Therefore the description herein is mostly in terms of the merging two—or of more than two—DFAs. In one embodiment, such merging is a three-step process: a) converting the DFAs to NFAs; b) merging the NFAs into a single NFA; and c) converting the merged NFA into a DFA.

The converting of a DFA to an NFA prior to merging the DFAs is a simple operation, and includes for example, adding null transitions from a single start state to each of the start states of the DFA. Thus, this section will assume such transforming to a NFA has been carried out for each DFA, e.g., DFA of set 407.

Figure 7:
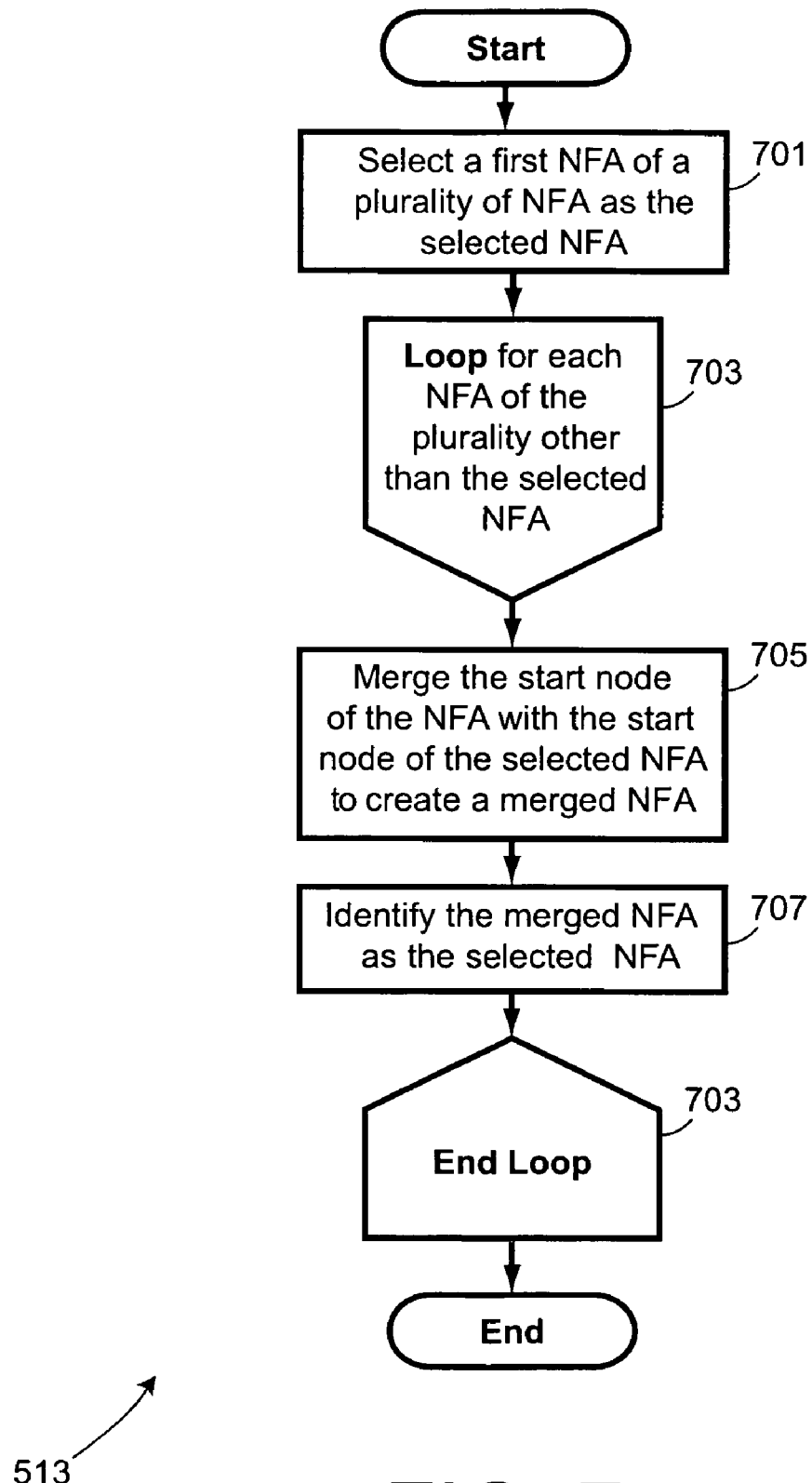
FIG. 7 shows a flowchart describing one embodiment of a method of merging a plurality of NFAs to create a single NFA to replace the plurality of NFAs.

FIG. 7 shows a flowchart describing one embodiment of a method of merging a plurality of NFAs to create a single NFA that can replace the plurality. The embodiment shown in FIG. 7 can be used, for example, to implement block 513 of the flow chart of FIG. 5.

The description provided herein of the method will only be in terms of an abstract NFA. How to use the description to merge the data structure(s) used to represent such abstract NFAs will not be explicitly described, but would be clear to one in the art from the description provided herein.

An NFA, by the definition used herein, contains a single start state. Thus, it is assumed that the NFAs to be merged each have a single start state. The path or paths from such a start state may be null (⊖) transitions. Furthermore, paths of a state of an NFA do not have any restrictions in terms of having more than one path associated with the same input.

One method of merging two NFAs combines the paths of the start state in the first NFA with the paths of the start state in the second NFA to form a new start state.

The forming of NFAs having a single start state can be combined with the merging by using existing or adding null (ε) paths from a new start state to each of the previous start states. This results in a single NFA, e.g., a single state machine with a single start state.

Referring now to FIG. 7, in 701, a first NFA of the plurality is selected and so it becomes the selected NFA. In 703, the method loops for each NFA (the "current" NFA) of the plurality of NFAs other than the selected NFA. For example, if there are three NFAs, loop 703 applies for the second and third NFA. In 705, the method merges the start node of the selected NFA and the start node of the current NFA. This results in a merged NFA that is in 707 identified as the selected NFA. The looping of 703, 705 and 707 transforms a plurality of NFAs into a single NFA that has the combined state machine functionality of the plurality of NFAs.

While FIG. 7 shows merging two NFAs into a single NFA, an alternate embodiment to the pair-wise combining of FIG.

7 is to combine a plurality of more than two NFAs into a single NFA in a single step. Block 705 of FIG. 7 would include merging the respective start nodes of each of the to-be-merged NFAs. Thus, how to modify the merging of FIG. 7 to merge as many NFAs as required into a single NFA would be clear to one skilled in the art from the description herein.

Database Generation

Another aspect of the invention is creating a compact pattern database from at least one data structure representing at least one state machine. The adjective "compact" is indicative of the storage space efficiency of the database representation.

Figure 8:
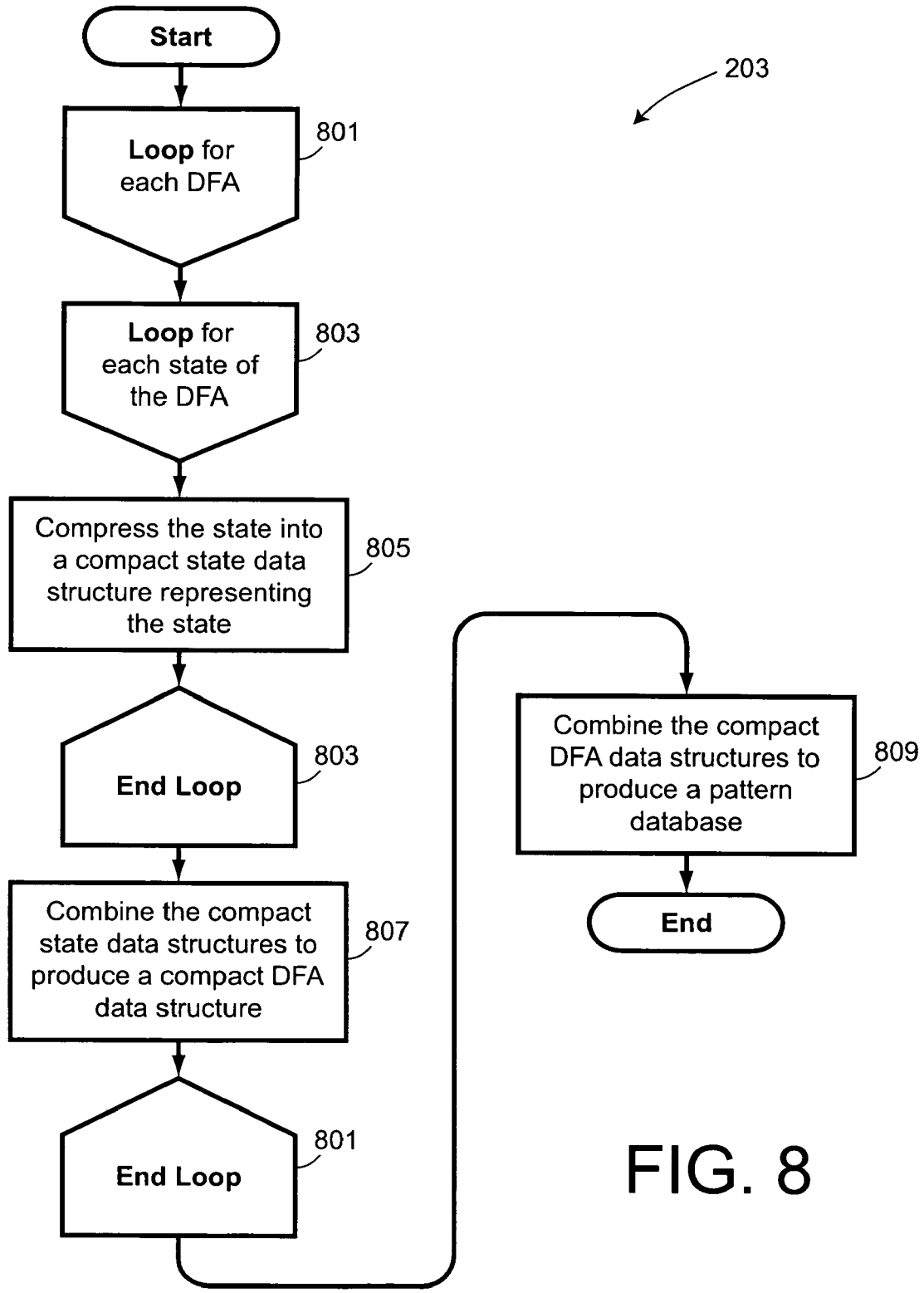
FIG. 8 shows a flowchart describing one embodiment of a method of creating a pattern database from at least one DFA associated with at least one pattern.

FIG. 8 shows a flowchart describing one embodiment of a method of creating a pattern database from at least one DFA associated with at least one pattern, e.g., an embodiment of block 203 of the flowchart of FIG. 2.

Block 801 defines a loop of blocks 803, 805 and 807 for each DFA of the at least one DFA. Block 803 defines a loop of block 805 for each state of the DFA. In 805, the state is compressed and represented in a compact state data structure. In 807, after the operations of 805 are carried out for each state of the DFA, the resultant compact state data structures are combined to produce a compact DFA data structure. After 803, 805 and 807 are carried out for each DFA of the at least one DFA, in 809, the compact DFA data structures are combined to produce a pattern database.

Database Optimizations

The compressing of a state into a compact state data structure is now explained in more detail.

The inventors have found that, in practice, data structures representing states of a given state machine include redundancies. Aspects of the present invention include how to efficiently represent the state information for the state of a state machine, e.g., to represent states in a compressed form.

Exemplary State Machine and States to Describe Database Optimization

Each state of a state machine has a path to the next state for particular input, and furthermore, includes an indication of those states that are hit states. In the examples described herein, the input is assumed to be an octet, i.e., 8-bits. Thus, there are 256 possible input values, and therefore, 256 possible paths from any state to a next state. Of course, not all next states are distinct. Many for example may loop back into the same state.

Figure 18:
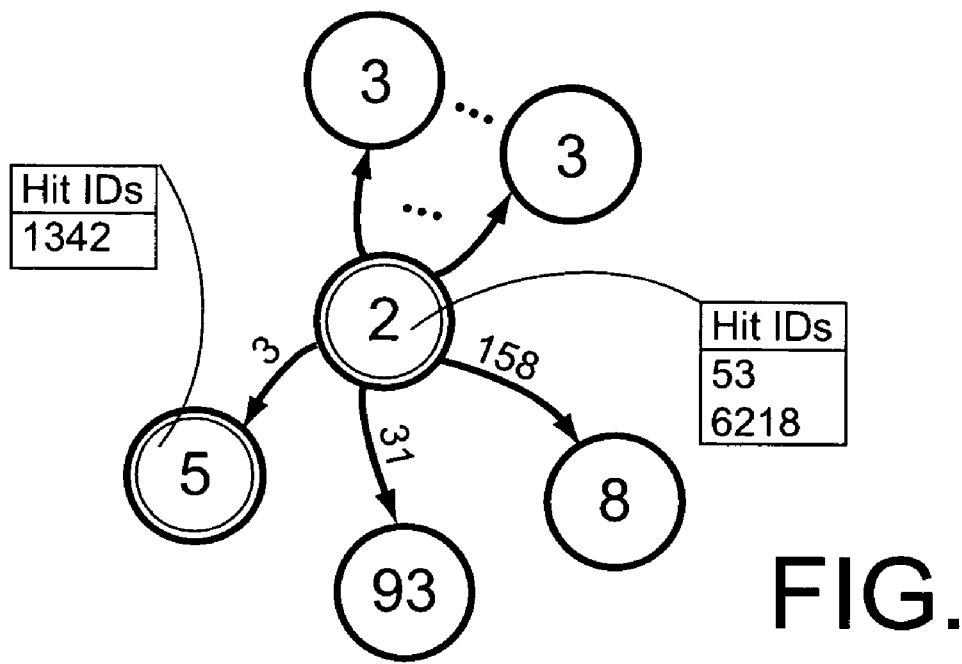
FIGS. 18 and 19 are two exemplary states that are used for illustrative purposes in this description.
Figure 19:
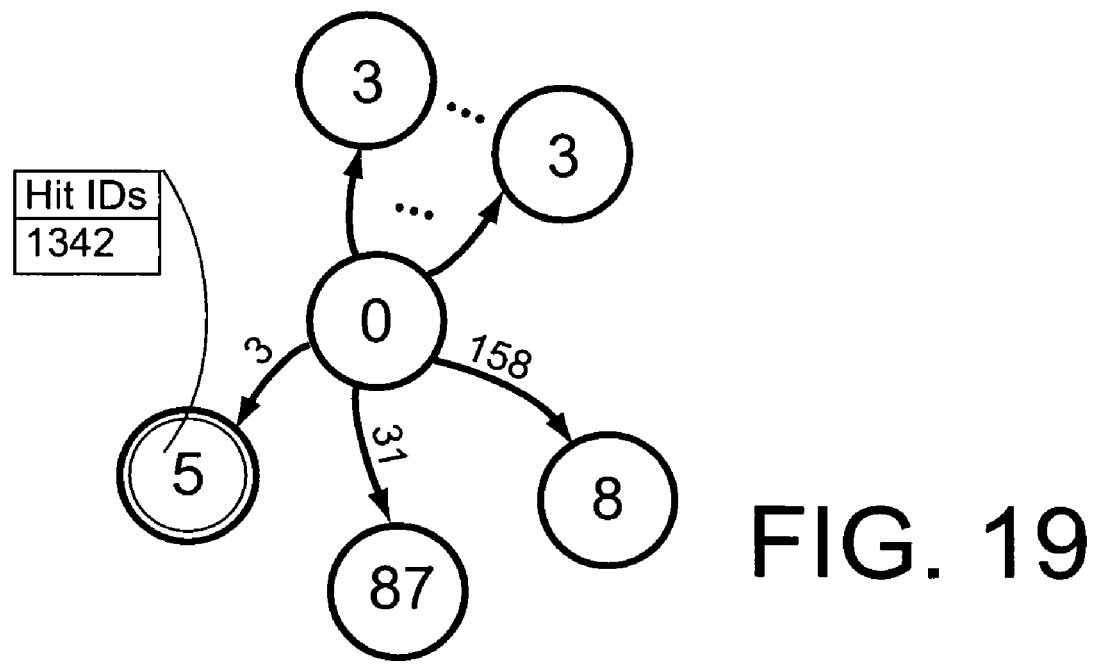

To better illustrate the inventive aspects and methods, an exemplary state machine and two exemplary states of the state machine are provided herein. FIG. 18 is a state diagram of a first exemplary state, labeled state 2, and FIG. 19 is a state diagram for a second exemplary state, labeled state 0. In these examples, all states have a numeric label in the center of the state symbol in the state diagrams.

In the examples, all index and bit positions are assumed to start with a position of index 0. For example, index 0 represents the first item of a list of items, and bit 5 is the sixth least significant bit, where bit 0 is the least significant bit. Of course in alternate embodiments, other arrangements are possible. For example, bit 0 may be used to indicate the most significant bit.

The exemplary state machine uses 32-bit numbers as pattern IDs of hits. The pattern ID of a hit is called a hit ID. Any state that represents a hit is called a hit state and is illustrated with a double circle. See, for example, the states labeled 2 and 5 in FIG. 18, and the state labeled 5 in FIG. 19. A hit state may have a number of hit IDs. In the examples, an 8-bit number is used to represent the number of hits, e.g., the number of hit IDs for any particular hit state.

The next state from any state, e.g., the path from any state to a next state uses a 32-bit pointer called a state pointer to point to the data structure of the data defining the next state. In the state diagrams of FIGS. 18 and 19, the input is indicated as a number from 0 to 255 that represents the decimal number of the 8-bits. In an alternate embodiment, the input may be indicated by an 8-bit index to an 8-bit value.

Typically, if there are a lot of paths to one next state that do not include input values, any input other than the ones indicated leads to that next state. Therefore, in the example of FIG. 18 that shows the state diagram of an exemplary state (state 2) of the overall exemplary state diagram, any input other than 3, 31, and 158 leads to the state labeled state 3. The inputs 3, 31, 158 lead to next states labeled 5, 93, and 8 respectively. Furthermore, this exemplary state 2 is a hit state with two hits IDs: 53 and 6218. The next state 5 is the only next state that is a hit state, and has a single hit ID: 1342.

FIG. 19 shows the second exemplary state labeled state 0. State 0 is identical to the exemplary state except that it is not a hit state, and the path for input 31 is to state 87.

A First State Data Structure

One method of representing a state and thus a state representation includes allocating memory for each data item that may be required to define the state. Such a first method includes allocating memory to indicate:

All possible next states, e.g., by providing 256 state pointers, each 32 bits, using a total of 8196-bits.

The number of hit IDs of any hit state, e.g., with a number 0 indicating that the state is not a hit state. This is 8-bits in the present example.

The hit IDs of all the hits in the case of a hit state. With 32-bits per hit, this could be up to 256 32-bit numbers, so up to 8196-bits. For the state 2 of FIG. 18, this is 64-bits (8-octets)

By an array is meant a list of items of the same type, e.g., referred to by the same name and ordered by a numerical index. In one embodiment, the next state pointers and the Hit IDs in the state data structure are in the form of arrays. In alternate embodiments, structures other than arrays may be used to represent items, e.g., items of a list.

Figure 20:
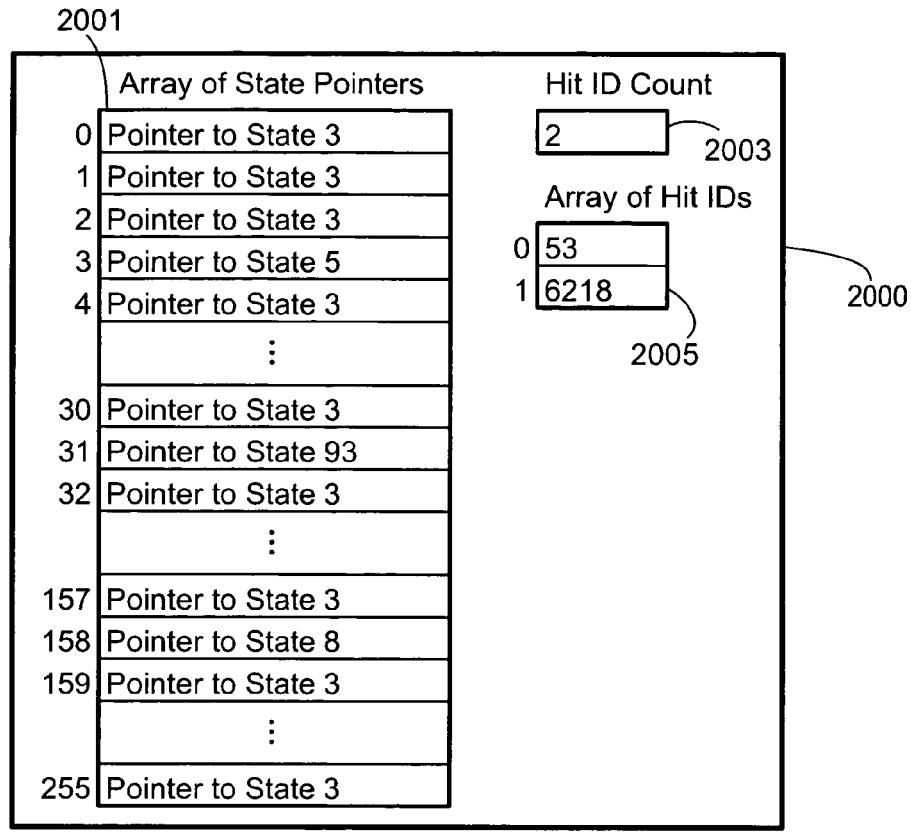
FIG. 20 shows one embodiment of a data structure for the state shown in FIG. 18.

FIG. 20 shows a data structure 2000 for the state shown in FIG. 18. The data structure includes an array 2001 of next state pointers, a field for the number of Hit IDs (the "Hit ID Count" field) 2003 containing the number 2, and an array 2005 of Hit IDs for this state, since this is a hit state.

The first data structure such as structure 2000 may require a relatively large amount of memory to represent each state. Representing all the states of a state machine using the first data structure may require an unacceptably large amount of memory. An aspect of the invention is converting such a structure into a compact representation of a state.

Differential Encoding (List/Array Mapping)

The inventors have found that, states of state machines for patterns that are used in practice, e.g., in network applications, are highly repetitive in that many states seem similar, and therefore there is redundant information that provides for compression. The inventors noticed that many state pointers in a particular state of a state machine are identical, e.g., they point to the same next state. Similarly, the inventors also noticed that many states of a state machine are similar to other states of the state machine. The two states 2 and 0 of FIGS. 18 and 19, for example are similar.

One aspect of the invention uses this discovery that there is often redundant information in a state machine for recognizing patterns in actual applications.

One embodiment of the invention uses differential encoding of some of the states. With differential encoding, a particular structure is assumed as a reference or base structure, and only information on what items are different from corresponding items in the reference structure and information on how such items differ are provided. Such differential encoding is used in one aspect of the invention to compress parts of data structures representing a state machine, e.g., to take advantage of redundant parts of the state machine. We call such differential encoding list mapping, and also array mapping herein, since arrays are commonly used in the embodiments presented herein to represent lists.

As an example, consider a list of a number, denoted n, of values in a state data structure, each value k-bits long, with $n \geq 1$ and $k \geq 1$. One way to represent these values in memory is to create an array of n values, each k-bits, thus using a total of $n \times k$ bits. Such a representation can be looked up easily, e.g., to read the i'th value of the list involves reading the k bits starting at the $(i \times k)$'th bit position of the array, where i denotes a number $0 \leq i < n$. Suppose a number denoted m of values of the list of n values are provided elsewhere, e.g., in another data structure, called the reference data structure herein, with $1 \leq m \leq n$. The reference data structure represents at least these m values. In a particular example, suppose the reference data structure is a data structure that includes a total of n values, each of k-bits.

In the case, that the values are in the state data structure, an aspect of the invention includes providing a reference data structure, and creating a shortened data structure that includes: a list (the "shortened" list), e.g., a shortened array of (n−m) values, each k-bits that provides the values not provided in the reference data structure, and an indication to indicate which values are included in the state data structure, and which values are obtained by referring to the reference data structure. By a "list map" is meant an indication of which elements are included in the data structure, and thus of which elements are not included in the data structure and may be found in the other data structure. When the lists are in the form of arrays, the term "array map" also is used to mean a list map.

Such a shortened data structure containing a shortened list and a list map is a first method of differential encoding.

A second method of differential encoding includes, like the first method, using a shortened list that includes information on (n−m) values. The shortened list of the second method, however, does not include complete data for these (n−m) values but only differences from corresponding values in the reference data structure.

While implementations of the invention may use the first method or the second method, or other alternate methods, the first or second method of differential encoding is assumed in the description herein.

In one embodiment, the list map is a list of binary-valued information for each item location in the list of n-items to indicate whether or not the information item at the item location different from that in the reference data structure. Thus, in one embodiment, the list map is an array map of a bit mask of length n bits. The position in the mask indicates the value, so that each bit mark position indicates one of the n values. Thus, in one embodiment, a bit that is set in a particular position of the array indicates that the corresponding element to the particular position is in the shortened array, and a bit that is not set in a particular position indicates that shortened array does not have the value; the value is then obtainable from the reference data structure. That is, the i'th bit of the array map is 1 if the i'th value of the list is included in the shortened array, and 0 if the value is not, so that the reference data structure is needed for the value. Of course, the assignment of 1 and 0 is arbitrary and can be trivially reversed in an alternate embodiment. Furthermore, in the case that m=n, the shortened array of values is empty, e.g., it includes no values of the original list of values, and the reference data structure is needed to obtain any and all values.

Using such a data structure, accessing the i'th value of the list includes looking up the i'th bit of the array map. If the bit is 0, then the i'th value is one of the m values provided elsewhere, e.g., in a reference data structure, requiring further looking up in the reference data structure. If the bit is 1, in one embodiment, the (n−m) entries in the shortened array are provided in the same order as in the list, such that the position of the required i'th entry is calculated according to the number of set bits in bit positions 0 through i−1 of the array map, inclusive. Denote this number as s. If i is 0, s is 0. The i'th value of the list is the k bits starting at bit position $s \times k$ of the shortened array of values. In one embodiment, the reference data structure includes n values, and the missing i'th entry value of the list is the i'th entry of the reference data structure.

Thus, an improved data structure includes a shortened array of $(n-m) \times k$ bits of values and an n bit array map used as a bit mask. When m is sufficiently large, such an improved data structure can be substantially smaller compared to a data structure without such list/array mapping features.

State Aggregation

Another aspect of the invention is state aggregation. The inventors observed that in practice, many state pointers point to an identical state. One version of a state data structure includes an array (a list) of state pointers. One embodiment of state aggregation includes using array mapping applied to the list of state pointers of the state information data structure to create a shortened list of state pointers, together with a bit mask as an array map of state pointers. The reference data structure for the array pointer is the state information data structure of at least one state—typically of exactly one state.

Consider creating state information data structure with state aggregation for a particular state. Creating the state data structure includes determining one or more often-repeated pointers in the list of state pointers of an uncompressed state data structure of the particular state. In one embodiment, exactly one most often repeated state pointer is determined. There may, of course, be more than one next state pointer that is the most often repeated, and in such a case, any one of these most often repeated state pointers can be used.

In one embodiment, the compressed data structure for a state using state aggregation includes:

A field for the most often repeated next state, e.g., the most often repeated state pointer.

The shortened list, e.g., the shortened array of next state pointers.

A bit mask field for the list map, e.g., bit mask indicating the state pointers in the shortened list.

The shortened list and the list map, e.g., bit mask are determined by array mapping as described above in the "List mapping" subsection. The reference data structure that contains the "m values provided elsewhere" is the data structure for the most repeated next state.

Figure 21:
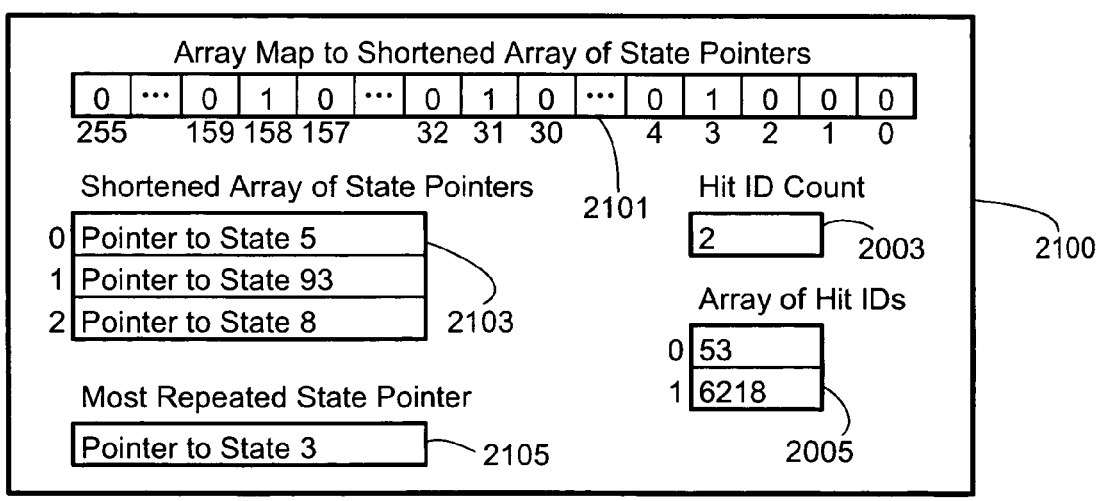
FIG. 21 shows one embodiment a data structure that is a compressed version of the structure of FIG. 20 representing the state shown in FIG. 18. The compression uses what is called state aggregation herein, according to which a shortened list of next states is included, as well as an indication of a most often repeated next state. The shortened list is of next states other than the most often repeated next state. A mapping called an array map is included that indicates which of the totality of next states are included in the shortened list.

FIG. 21 shows a compressed state data structure 2100 which is a compressed version of the structure 2000 of FIG. 20 representing the state 2 shown in FIG. 18. The compression uses state aggregation. A 32-bit field 2105 is included pointing to state 3, i.e., a state pointer to the most repeated state pointer. A 256-bit array map 2101 is included as a bit mask to indicate which next states of all possible 256 next states are included in this data structure. A shortened array of next states 2103 is included for those inputs indicated by a set bit in the array map 2101. Therefore, since only three states other than state 3 are the next state of state 2, the shortened array of state pointers includes three 32-bit values pointing to states 5, 93, and 8, respectively. Since input values of 3, 31, and 158, respectively produce these state transitions, the array map bit mask 2101 has a 1 in bit positions 3, 31 and 158, and has 0s elsewhere. Any input other than those with 1 in the corresponding position in the array map bit mask 2101 have a next state pointed to by the most repeated state pointer 2105.

Continuing with the example, to read the state pointer at index 31 of the list of state pointers, e.g., in the data structure 2000 of FIG. 20, a first read bit 31 of the field 2101 is read representing the array map of state pointers. Finding that it is 1, a calculation of the number of set bits in bit positions 0 through 30, inclusive, of the array is performed. This calculation results in 1 (the bit set at position 3). This result is used to read the state pointer at index 1 of the array 2103 representing the shortened list of pointers in order to obtain the next state pointer pointing to state 93. As another example, to read the state pointer at index 50 of the list of state pointers in the full next state list 2001 (FIG. 20), bit 50 of the array map is read. Finding that it is 0, the next state is that pointed to by the most repeated state pointer 2105, that is, state 3.

State-Zero Mapping

The inventors also observed that in many practical situations, many states of a state machine are similar to a particular state called the base state. One aspect of the invention uses this observation to compress a state data structure, e.g., as shown in FIG. 20, by only including information related to the base state. By two states being "similar" is meant that the two states have lists of state pointers that are similar. For example, for similar states, for any given input character, it is likely that the next state is the same from both states. Two states are similar, for example, when most inputs of the possible inputs have the same next state. Comparing FIGS. 18 and 19, for example, shows that state 2 is similar to state 0 in that only the input 31 produces a different next state.

The inventors have found that in many state machines for actual situations, the starting state is a suitable base state in that a high level of compression is obtained for the data structures representing such state machines when the starting state is selected as the base state. In other words, the inventors have observed that many states of state machines are similar to the starting state. Conventionally, the starting state is arbitrarily labeled state 0. Therefore, one embodiment of the compression method uses the starting state 0 as the base state, and provides a data structure with information on how that state differs from the base state 0. This aspect is therefore called "state-zero mapping" herein. State-zero mapping is typically used as an alternate to, rather than together with state aggregation.

In one version, state-zero mapping uses the array map method applied to the full list of state pointers, e.g., list 2001 of FIG. 20, to create a shortened list of state pointers. The data structure representing the first state of a state machine does not use state-zero mapping.

In one embodiment, for a particular state, creating a data structure that uses state-zero mapping includes determining which next state pointers from that particular state differ from the next state pointers of state zero (the base state). How to find the differences between the two lists, and methods for so determining the list of differences are well known to those in the art. FIG. 24 is a C-language program for a method of determining the differences between a first array array_1 of length length and a second array denoted array_2 also of length length. The program returns an array diff_array of length length of which array elements are different, i.e., of the indices of the arrays that are different. Of course alternate methods are known.

According to this aspect of the invention, a shortened data structure using state-zero mapping includes: a shortened list, e.g., a shortened array of state pointers, and a field containing an array map describing which next state pointers are in the shortened array. The shortened array of state pointers and the array map bit mask are determined by array mapping as described above in the subsection titled "List Mapping." In this application of list mapping, the m values provided elsewhere are those state pointers of the particular state that are identical to the state pointers of state-zero.

Figure 22:
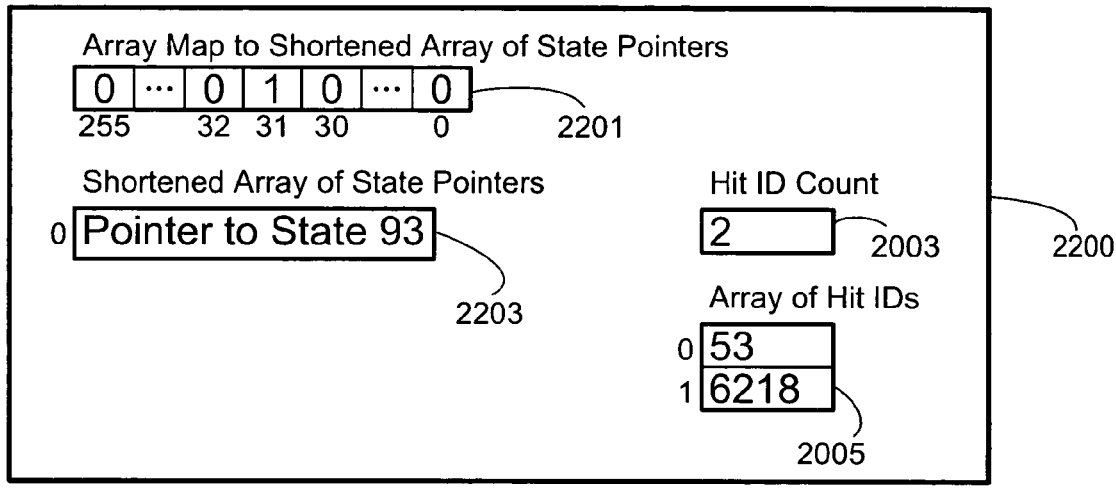
FIG. 22 shows one embodiment of a data structure that is also a compressed version of the structure of FIG. 20 representing the state shown in FIG. 18. The compression uses what is called base-state mapping herein, according to which a shortened list of next states is included. The shortened list is of those next states that are different than the next states of a base state. In the embodiment described herein, the base state is state-0, so base-state mapping is called state-mapping herein. An array map is included that indicates which of the totality of next states are included in the shortened list.

FIG. 22 shows an example shortened data structure 2200 for state 2 of FIG. 18 using state 0 as shown in FIG. 19 as the base state. All next states of state 2 other than that for input 31 are the same as state 0. The data structure 2200 therefore includes a shortened array 2203 of state pointers that have only a single 32-bit value: a next state pointer pointing to state 93. Data structure 2200 also includes a 256-bit array map 2201—a bit mask—consisting of a 1 in bit position 31 and 0s elsewhere.

Using the data structure 2200 to obtain the next state for an input 31, that is, for the state pointer at index 31 of the list of state pointers 2001 of FIG. 20 includes reading the bit at position 31 of the array map bit mask 2201. Finding that it is 1, a calculation of the number of 1 bits in the array map in bit positions 0 through 30, inclusive, is performed. This result being 0 is then used to read the state pointer at index 0 of the shortened array 2203 of pointers to get the first (and only) next state pointer pointing to state 93. Similarly, to obtain the next state pointer for an input 50, e.g., at index 50 of the list of state pointers 2001 of FIG. 20, bit 50 of the array map 2201 is read. Finding that it is 0, the state pointer of the base state-state zero—at index 50 is used to obtain the next state pointer, which in this case points to state 3.

Note that while the embodiment herein uses state-zero as the base state, in an alternate embodiment, a state other than the starting state can be used as the base state. In one embodiment, the shortened data structure includes a field that points to the base state. In this manner, several base states may be used in compressing all the states, and any such compressed state would include the state to which it is similar.

Bit Aggregation

The inventors have noticed that for many states of a state machine encountered in practice, after compression using either state aggregation or state-zero mapping, the resulting array map bit mask consists of mostly 0's. Thus, the array map appears similar to a reference array map, e.g., of all 0s. Another aspect of the invention, applicable to the state aggregation compression method and to the state-zero mapping compression method, is called bit aggregation herein. Bit aggregation uses array mapping applied to the array map bit mask of a compressed data structure that uses either state aggregation or state-zero mapping to obtain further compression. Such array mapping will therefore lead to another array map bit mask. To avoid confusion in this description, the array map bit mask used for the next state pointer array is called the state pointer array map, and also the state pointer array bit mask herein below, and sometimes the first array map. These terms apply to both state aggregation and state-zero mapping embodiments. The bit aggregation array map will be called the bit aggregation array map and also the array map (or list map) of the second kind herein.

Bit aggregation is applicable when the state pointer array map can be partitioned into a number, denoted $n_p$, of subfields of a number, denoted $k_p$ of bits. A data structure using bit aggregation includes: a shortened state pointer array map field and a bit aggregation array map field for this shortened state pointer array map. The two fields are determined by list mapping, and the reader is referred to the "List mapping" subsection of this description for further details, where for this application, n is the number $n_p$ of subfields, k is the number $k_p$ of bits of each subfield, and the "m values provided elsewhere" are those subfields that are have $k_p$ zeroes, i.e., that are identical to a $k_p$-bit sized reference subfield that, for example, consists entirely of 0's.

Figure 23:
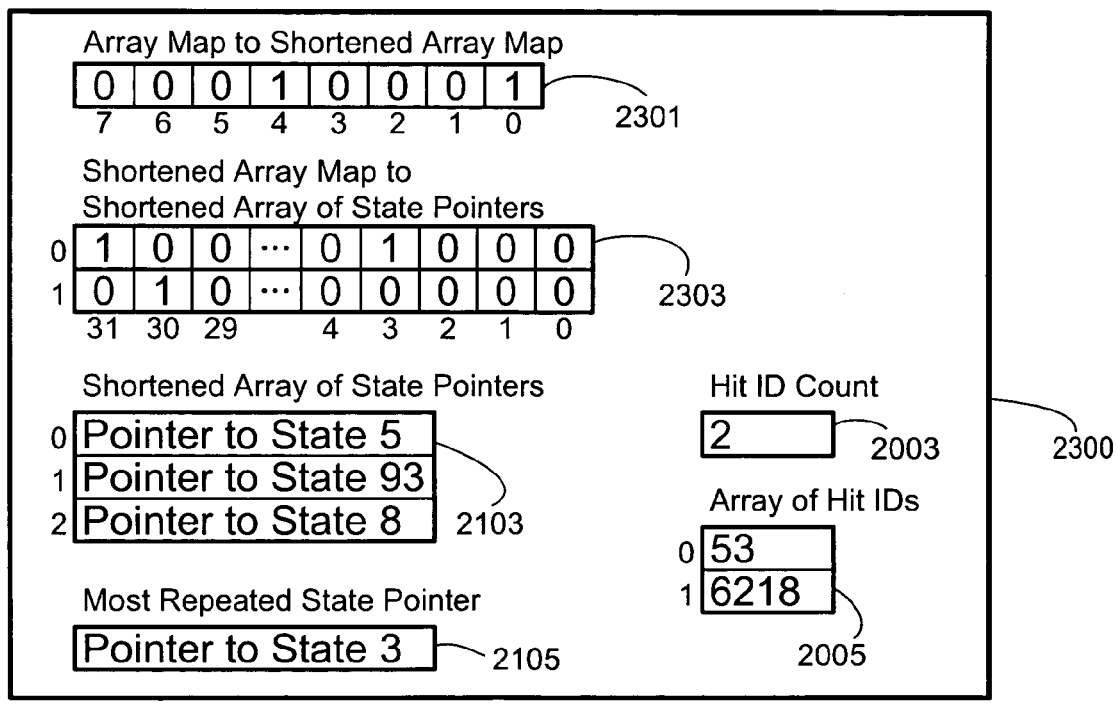
FIG. 23 shows one embodiment of a data structure that is a further compressed version of the structure of FIG. 22. The further compression uses what is called bit aggregation herein, according to which the array map is compressed.

As an example, consider the data structure 2100 that uses state aggregation to compress the structure 2000 of FIG. 20 for state 2 of FIG. 18. The original state pointer array map 2101 is a 256-bit array map consisting of 1s in bit positions 3, 31 and 158, and of 0s elsewhere. This state pointer array map 2101 can be divided into eight 32-bit sized subfields indexed by 0, 1, 2, ..., 7. After such division into subfields, the subfields indexed 0, 1, 2, 3, 4, 5, 6 and 7 consist entirely of 0 in each bit position. Subfield 0 consists of 1 in bit positions 3 and 31, and 0 elsewhere. Subfield 4 consists of a 1 in the bit position [158-(32×4)]=30, and 0 elsewhere. FIG. 23 shows a data structure 2300 for state 2 of FIG. 18 that includes both state aggregation and bit aggregation. The shortened array of next state pointers 2103, the most repeated state pointer 2105, the Hit ID count field 2003, and the array 2005 of hit IDs is as before. A shortened state pointer array map 2303 is included and has only subfield 0 and subfield 4. An array map bit mask 2301 to this shortened state pointer array map has only 8-bits, one for each possible subfield of the state pointer array map. The array map bit mask 2301 has 1 in bit positions 0 and 4, and 0 elsewhere.

Several ways of compressing a state pointer array map for the case of state-zero mapping are possible and included in the scope of the invention.

One method embodiment of obtaining the next state, e.g., the next state pointer from a data structure created using bit mapping includes recreating the full length state pointer array map, in this case a 256-bits array map to the shortened list of state pointers. For each 1 in the array map to the shortened state pointer array map, the appropriate array map subfield is read and copied to the corresponding position in the full-length state pointer array map. This array map, along with the shortened list of state pointers, is used to read the requested state pointer as described above. In alternate embodiments, the full-length array map is not recreated, but rather the next state pointer is determined in a multi-step method.

Note that some different alternate embodiments use different alternate methods for bit aggregation. For example, one alternate embodiment uses run length coding to encode the number of consecutive zeroes between to the next bit location set to 1 in the full-length state pointer array map, including that there are no zeroes to the next set bit location in the array map.

A Hybrid Data Structure

Another aspect of the invention is using the list mapping of state aggregation, state-zero mapping, and bit aggregation in combination to create a relatively compact "hybrid" data structure for state information.

Figure 9:
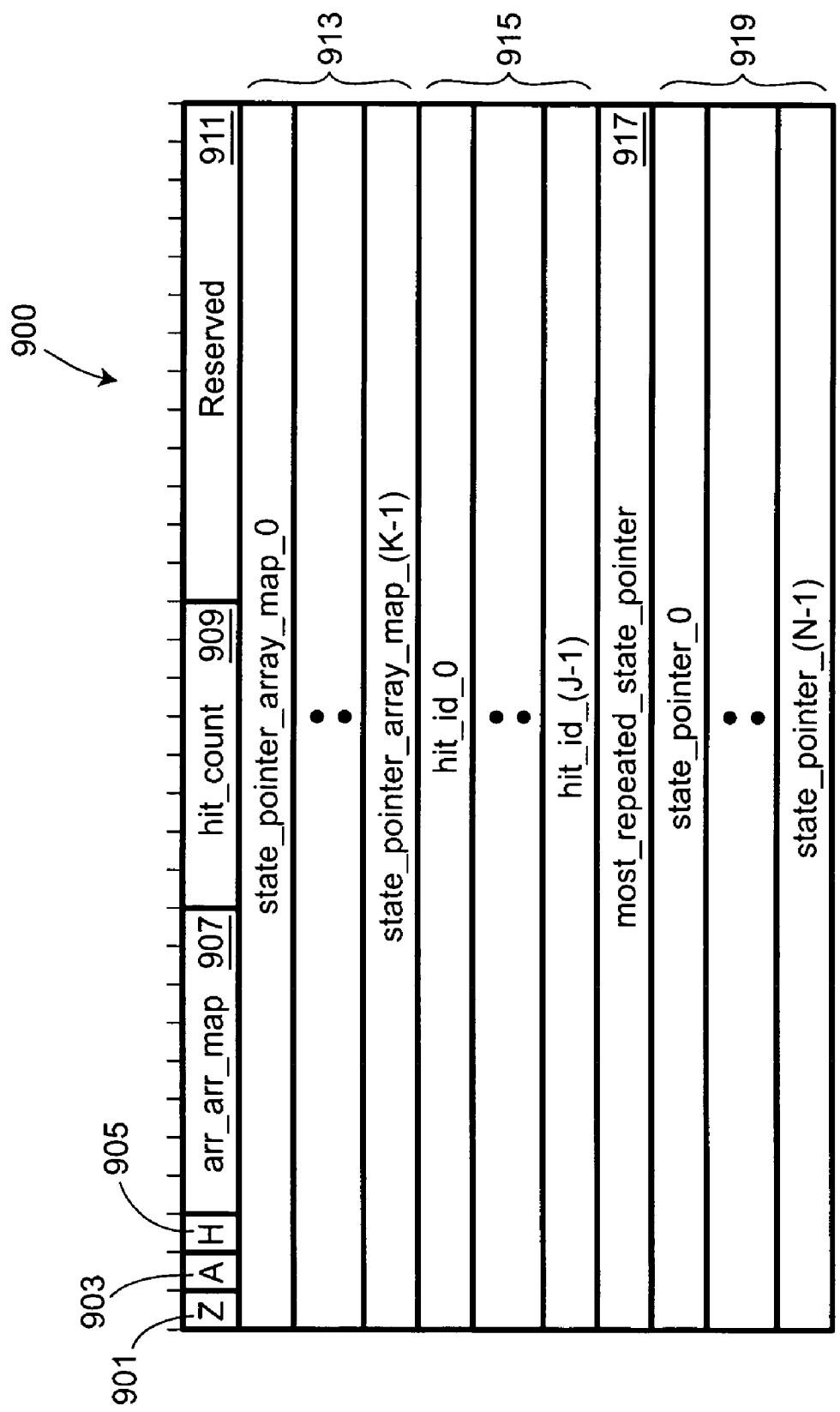
FIG. 9 shows a hybrid data structure for representing states of a state machine usable by pattern matching logic that can be implemented on a programmable processor, e.g., implemented as software executed by a computer, according to aspect/aspects of the present invention.

FIG. 9 shows one embodiment of a data structure 900 that can be useful in software-implemented state machines and that combines some of the above-described compressed representation aspects of the invention. The exemplary data structure 900 is organized into 32 columns, with one column per bit of data. Thus, each row of the data structure 900 represents 32 bits.

Data structure 900 includes a 1-bit field 901 called the state zero bit field that indicates whether or not the data structure 900 uses state-zero mapping. In one embodiment, a 1 indicates that state-zero mapping is used, and 0 indicates state-zero mapping is not used. Data structure 900 also includes a 1-bit field 903 called the state aggregation bit field that indicates whether or not the data structure 900 uses state aggregation. In one embodiment, a 1 indicates that state aggregation is used, and a 0 indicates state aggregation is not used. For any particular state represented by a data structure 900, at most one of state-zero mapping or state aggregation is used, but not both simultaneously, e.g., field 901 is 1 and field 903 is 0, or visa-versa.

In an alternate embodiment, a single bit is used to indicate whether state aggregation and not state-zero mapping is used, or state-zero mapping and not state aggregation is used.

Several other fields are included in structure 900, and their use and meaning depends on whether field 901 or field 903 is set, that is, on whether state-zero mapping or state aggregation is used.

In the case that field 903 is set, i.e., that state aggregation is used, a field 917 is used to point to the most repeated state. In the case that field 901 is set, i.e., that state-zero mapping is used, then field 917 is not included, e.g., field 917 is empty.

As in the previous example, suppose that each state can have 256 next-state pointers, and suppose that 32 bits are provided for each next state pointer. For example, suppose that the input alphabet as 256 characters, i.e., is representable by an octet.

Field 919 is a variable length field that is used to represent the shortened list, e.g., shortened array of state pointers. Suppose that there is number denoted N of such next states in the shortened list. Then the field 919 is 32×N-bits long. The pointers in field 919 are denoted by state_pointer_0, state_pointer_1, ..., state_pointer_(N−1). Implicit is that there is a 256-bit array map to this field.

The data structure 900 incorporates bit aggregation, so that rather than a full-length state pointer array map of 256 bits, a shortened pointer array map is included. Suppose that the full-length array map is divided into 32-bit subfields. Suppose K of these subfields have bits that are non-zero. A shortened array map that has K 32-bit entries 913 is included in the data structure 900. Denote by state_pointer_array_map_0, state_pointer_array_map_1, ..., state_pointer_array_map_(K−1) the K subfields of field 913. Thus, field 913 is an arbitrary sized field that includes a shortened pointer array map to the shortened list of state pointers 919. The data structure 900 further includes an 8-bit field 907 to indicate which subfields of the full 256-bit pointer array map have non-zero bits. That is, field 907 is an 8-bit field that includes an array map to the shortened pointer array map 913.

If field 901 is set, state-zero mapping is used, so that the shortened list 919 of pointers are for those next states that are different than in the base state 0. Note that in the case that the state's next state pointers are identical to those of state 0, N is 0, and thus the length of field 919 is 0.

Alternatively, if field 903 is set, such that state aggregation is used, the field 917 represents a pointer to the most repeated state, and field 919 represents those next state pointers that are other than to the most repeated state. The array map indicating which next states are other than the most repeated next state is constructed using 8-bit field 907 and the subfields in field 913.

The data structure 900 includes a binary valued field 905 called a hit field that indicates whether or not the state is a hit state. In one embodiment, a 1 indicates that the state is a hit state, and 0 indicates otherwise. In the case that the state is a hit state, field 909 is included as an 8-bit hit ID count field that indicates the number of hit IDs associated with the state represented by data structure 900. The hit ID's are each a 32-bit number. Field 915 is an arbitrary sized field that is either empty, e.g., in the case that state represented by data structure 900 is not a hit state, or includes a number (at least one) of 32-bit hit IDs, this number is indicated in the hit count field 909 in the case the state is a hit state, i.e., the hit field bit 905 is set. If the number of hit IDs in field 909 for the state is denoted by J, then the hit IDs in field 915 may be denoted as $hit\_id\_0, hit\_id\_1, \ldots, hit\_id\_(J-1)$.

In one embodiment, field 911 is reserved for future uses.

A Data Structure Configured for Rapid Data Retrieval

Figure 10:
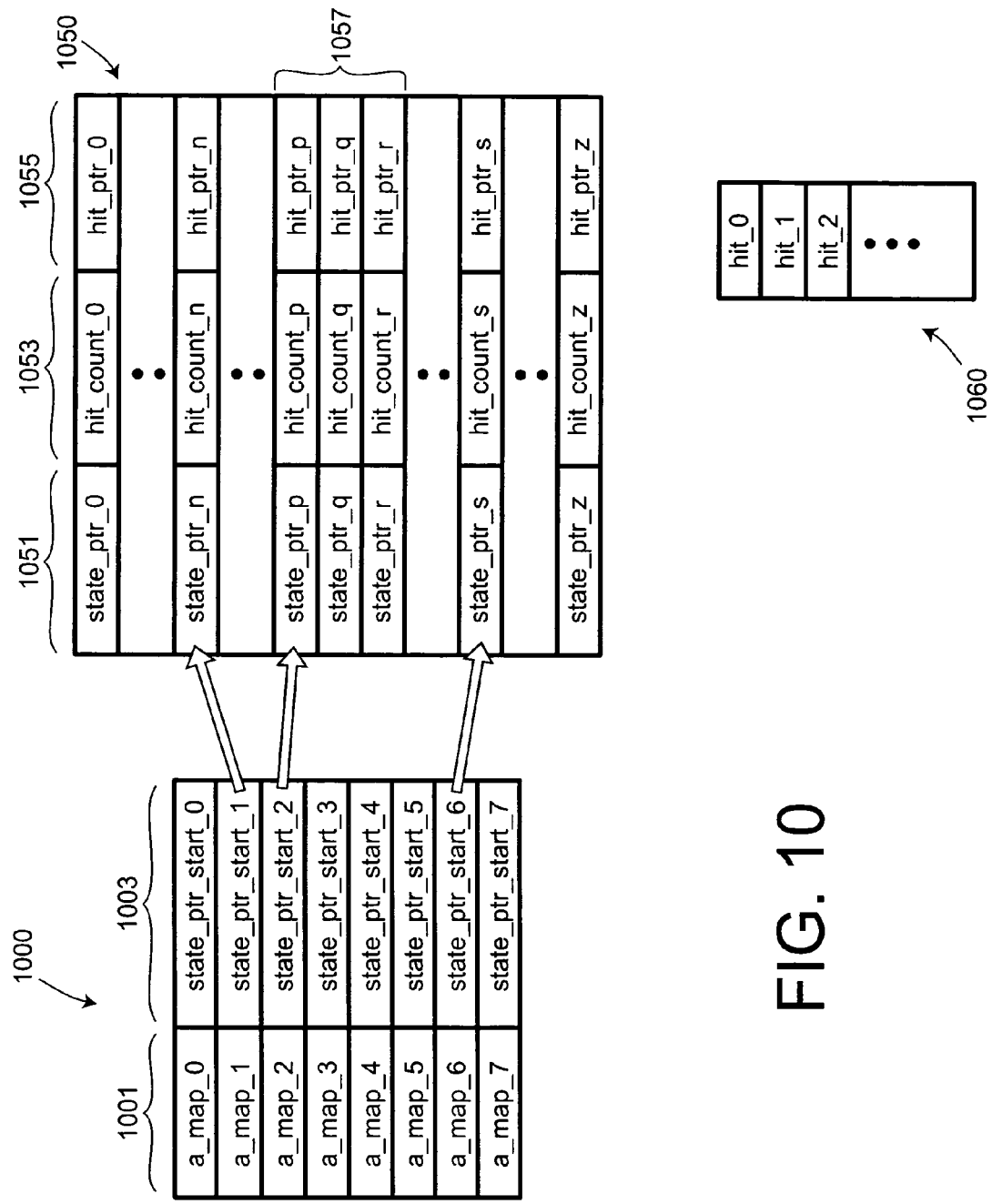
FIG. 10 shows a pair of data structures used for fast lookup and representing states of a state machine usable by pattern matching logic that can be implemented in hardware, according to aspect/aspects of the present invention.

Another aspect of the invention is creating and using data structures configured for machines requiring high-speed next-state lookups. These data structures use the list map and state-zero mapping aspects described above to create a set of fast-lookup data structures designed for fast lookup. The fast-lookup data structures represent states of a state machine. FIG. 10 shows a pair of data structures 1000, 1050 for fast-lookup that can be useful in machines requiring high-speed state lookups.

Recall that for each state of a state machine, state pointers are used to point to other states, e.g., to the next states. In one embodiment, a state pointer data structure 1050 is created that stores all the state pointers that point from states of the state machine. That is, state pointer data structure 1050 stores data for each path for every state of a state machine. Each entry in the data structure 1050 includes the state pointer, denoted state_ptr_i, where i denotes an index value, and also, for that next state pointed to by the state pointer, a field whose contents are denoted hit_count_i and containing the number of hit IDs for that next state, and another field whose contents are denoted hit_ptr_i and containing a pointer pointing to a data structure 1060 containing the list of hit IDs for that state. In one embodiment, the data structure 1060 containing the hit IDs is a simple array of values containing sequences of hit IDs. In the case of the next state not being a hit state, i.e., the case that there is no hit ID, then the hit pointer field is a null pointer, and the hit count field is 0. Thus, a single read of a row of data structure 1050 provides the pointer for the next state, an indication of whether the next state is a hit state, and if it is a hit state, the number of hit IDs, if any, for the next state, and a pointer to those hit IDs, if any.

In FIG. 10, all the next state pointers are shown as 1051, all the hit count fields are shown as 1053, and all the hit pointers are shown as 1055.

Another aspect of the invention is that for each state of the state machine for the patterns being searched, there is a data structure 1000 that includes pointers to the start of the next state list for that state, such that at any state, a single read of an entry of data structure 1000 and the input provides sufficient information to determine which entry to read for the next state in the data structure 1050. A second read provides the information for the next state in the data structure 1050. Thus, for each state of a state machine, the state data structure 1000 provides a way to determine from an input, e.g., an input octet, which next state pointer in data structure 1050, i.e., which path is applicable to that input.

Different embodiments are now described that provide for different amounts of compression.

The example described herein is for an 8-bit, i.e., an octet input such that there are 256 possible state transitions from any state.

The state data structure 1000 includes eight entries, e.g., rows, and each entry has a first field, denoted a_map_i, where i denotes an index $i=0, 1, \ldots 7$, and a field for the starting location of a sequential list of state pointer entries in the data structure 1050. Such starting locations are denoted state_ptr_start_i for the corresponding a_map_i, where i denotes an index, and, in FIG. 10, $i=0, 1, \ldots 7$. The a_map_i fields a_map_0, \ldots, a_map_7 are shown as entries 1001, and the state_ptr_start_i fields are state_ptr_start_0, are state_ptr_start_7 shown as fields 1003 in FIG. 10.

In one embodiment, for speed of reading by 32-bit processors, all entries are 32-bits long. Thus, the a_map_i fields and the state_ptr_start_i fields in each data structure of the form 1000, and state_ptr_i, hit_count_i, and hit_ptr_i fields in the data structure 1050 are each 32-bits long.

In an alternate embodiment, the a_map_i fields are each 8-bits long, the hit count hit_count_i fields are each 8-bits, and the other fields are 32-bits long.

Embodiments of the data structures 1000 and 1050 use state-zero mapping. Thus, for any state other than the zero state, there is a shortened list of next state pointers in data structure 1050, and a 256-bit state pointer array map. Therefore, for any state other than zero, the array map is split into eight subfields. These are the fields 1001 of data structure 1000. For each array map subfield of field 1000, say the (i+1)th subfield denoted a_map_i, if every bit of the array map subfield is not 0, e.g., there is at least a single 1 bit, such a 1-bit corresponding to an input and having a next state, there is a next state pointer in data structure 1050. Each a_map_i containing at least one non-zero bit has a corresponding sequential set of entries in the data structure 1050. The start location of the corresponding sequential set of entries is provided by the state_ptr_start_i fields corresponding to the a_map_i in data structure 1000. The position of any non-zero bit provides the particular next state information in data structure 1050. For example, consider a particular state pointer array map subfield, say a_map_2 that has a corresponding sequence 1057 of the three next states that are different than the next states of state-0. Suppose, as an example, that a_map_2 is 01001001. The input corresponding to the first least significant 1 in a_map_2 has a next state provided by the zero'th entry of the sequence 1057. The first entry in sequence 1057 is pointed to by state_ptr_start_2. Thus, the first least significant 1 in a_map_2 has a next state entry in 1050 pointed to by state_ptr_start_2 (see FIG. 10). The second 1 in a_map_2 corresponds to the first entry after that pointed to by state_ptr_start_2, i.e., by the next entry in 1057 having the next state pointer state_ptr_q. The third 1 in a_map_2 corresponds to the second entry after that pointed to by state_ptr_start_2, i.e., by the third entry in 1057 having the next state pointer state_ptr_r. The hit count and hit ID pointer of the entry are hit_count_r and hit_ptr_r, respectively.

Thus, a data structure 1050 of next states is constructible that contains a sequential set of entries in 1050 for the sequential subset of the shortened list of next states pointers for that state. To construct such a data structure 1000 includes building a structure 1000 for the first state that includes fields 1001 that are each all 1's, to indicate all next state pointers are included, and further, adding the entries of all states in the data structure 1050 and the pointers 1003 for each entry in the data structure 1000 to the start of the corresponding sequence of next state entries in 1050. For each state other than the zero state, constructing data structure 1000 includes constructing the subfields 1001 of the array map, and for each entry in data structure 1000, appending to the data structure 1050 the sequential subset of entries of the shortened list of next states for that state. The starting address for the appended entries in 1050 is then added to the state pointer start address field 1003 in the entry of 1000.

For any state, a first read of the data structure 1000 for a state for a particular entry identifies the starting location of the sequence of entries of 1050 that correspond to the entry of 1001, if there are any, and if there are such entries, the index within the subset of entries is provided by the location with the array map subfield. For example, if that bit corresponding to the input is 0, then the next state is the same as for state 0, and if the entry is a 1, then the ordering of the 1, e.g., the number of 1's in lesser significant positions within the subfield 1001, provides which entry in the sequence of next states provides the next state information. A read of the entry in 1050 then provides the next state information.

The inventors have noticed that the construction method just described may lead to a very large data structure 1050, and further noticed that there is likely to be redundant information in such a data structure 1050. Certainly particular next states are likely to appear more than once. Furthermore, there may be sequences of next states that start at some location pointed to by an entry of a state data structure 1000 that are either the same, or contained in sequences that also start at some location pointed to by an entry of the same or another state data structure of the form 1000.

Another aspect of the invention is, during or after construction, reducing the size of the next state structure 1050 by removing redundancies. One method of reducing the size of the next state structure 1050 includes during or after construction of the data structures, for any sequence of next states pointed to by a start pointer 1003 in state data structure 1000, searching the data structure 1050, e.g., the state pointer field 1051 to ascertain if the sequence of next states already exists in structure 1050. If the same sequence of state pointers already exists in data structure 1050, then in the case of constructing the structures, no new data need be added to the data structure 1050, and the state pointer start field 1003 is set to the location in structure 1050 of the already existing sequence. In the case of modifying an already constructed data structure, the sequence pointed to by the original state pointer start field 1003 is removed, the state pointer start field 1003 is changed to the start location of the found sequence in 1050, and all other start pointers are modified if required by the removal of entries in 1050.

Therefore one embodiment of a method of constructing the data structures 1000 for each state and a structure 1050 for the next states of a particular state machine includes the following:

1) Allocate space for the next state structures of form 1000 for each state.
2) For state 0, all next states are provided. Therefore, write 11111111 in each entry 1001, prepare entries for each of the next states in the structure 1050, and write pointers in each corresponding entry 1003 to the start of each sequence of eight next state entries in 1050.
3) For each state other than 0:
   3a) determine the next states that differ from the next states from state 0, and the inputs that produce such different next states. This forms a shortened list of next states. Prepare an array map bit mask for these entries, and split the array map into eight fields 1001 in the next state structure 1000 for the state.
   3b) for each sequence of the shortened list of next states corresponding to an entry of structure 1000, search the data structure 1050 to ascertain if such a sequence already exists. If such a sequence exists, set the start pointer of the corresponding field 1003 for entry of the state structure 1000. Or else, if the sequence does not exist in 1050, append the structure 1050 with the sequence of the next state information.

In one embodiment, once the structure 1050 is thus constructed, a further set of reduction steps is carried out to further compress structure 1050 by searching for each sequence to see if some other sequences are contained therein. For example, one such further reduction is carried out as follows:

4) Determine and select the longest sequence pointed to by a state pointer start entry 1003 of any of the state structures of form 1000. Select any such longest sequence if there is more than one. For such a selected sequence, determine any other sequence pointed to by state pointer start entry 1003 of any of the state structures of form 1000 that is the same as the whole or a subsequence of the selected sequence. If such other sequence is found, replace the pointer 1003 to the start of such other sequence with the appropriate location in the selected sequence. Repeat for all other sequences. Now iterate again by searching for the longest sequence. Such iteration is repeated until no further compression is possible. To reduce the amount of start pointer replacements, the searches for other sequences start at the bottom of the structure 1050. At the end of the iterations, the overall size of the data structure 1050 is reduced by removing any blank spaces that formally were occupied by sequences, and recalculating the values of all state pointer start fields 1003 in any state structures 1000.

Pattern Matching Apparatus (Pattern Matching Logic)

Figure 11:
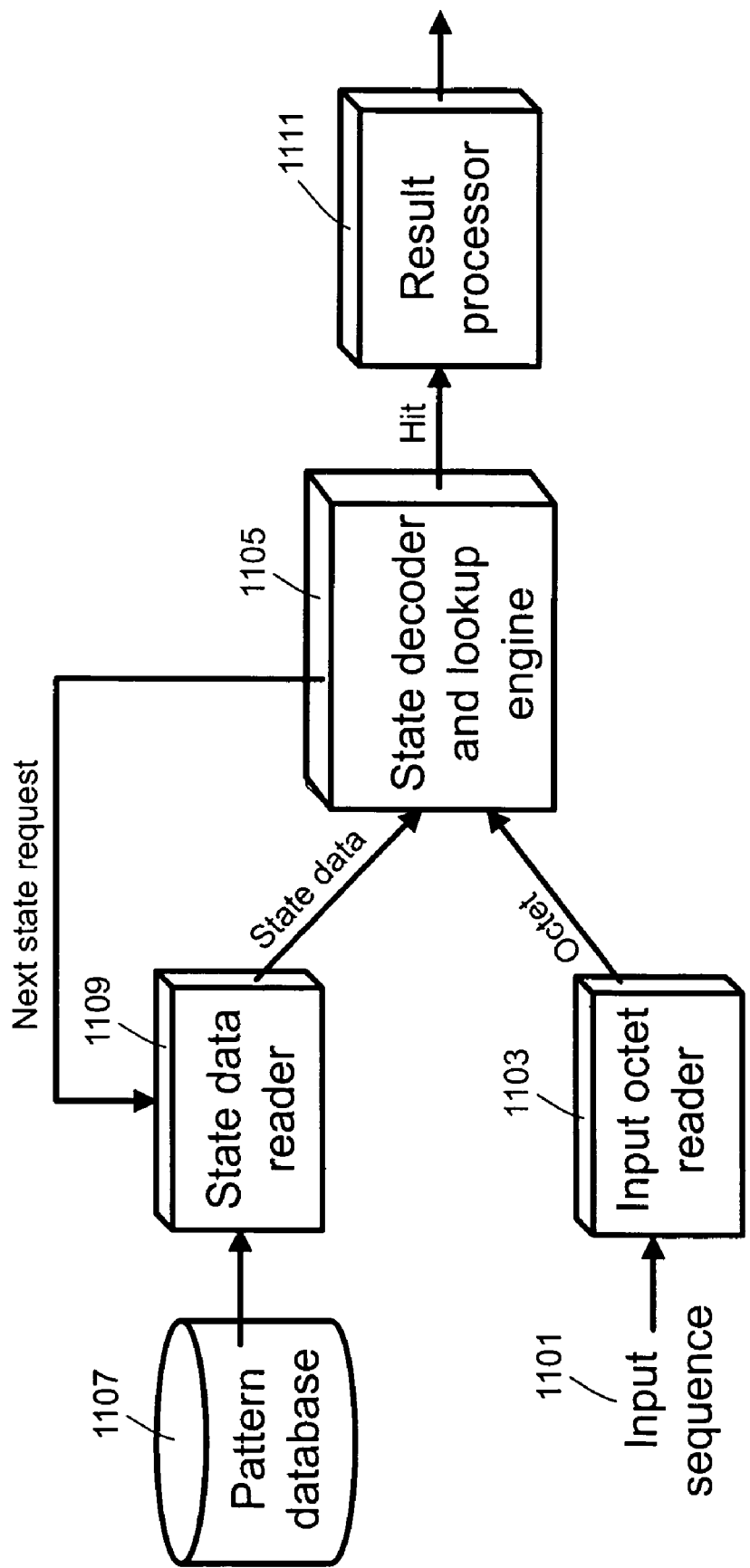
FIG. 11 shows a data flow diagram of one embodiment of pattern matching logic to read an input to produce an output of match results according to a state machine description stored in a pattern database.
Figure 12:
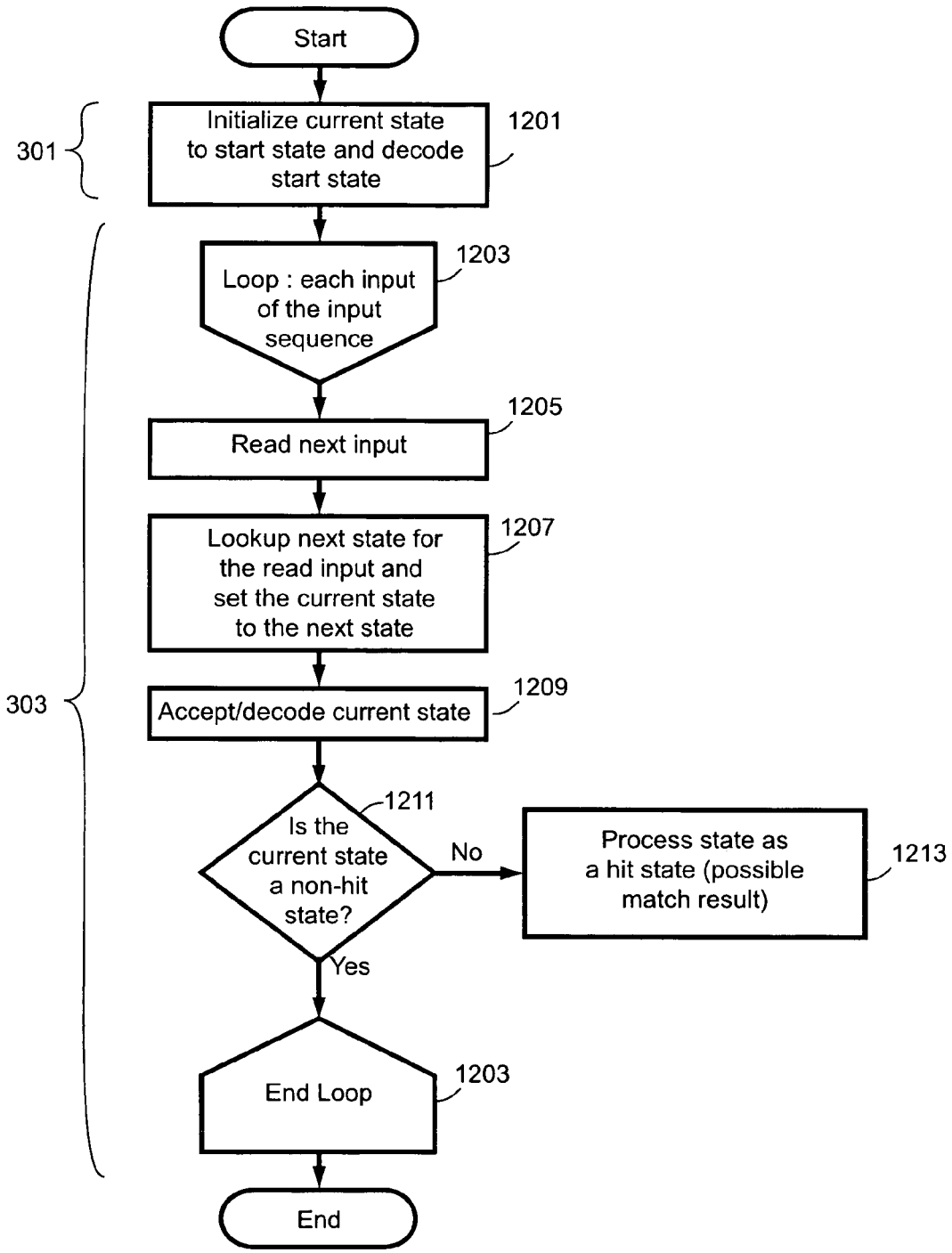
FIG. 12 shows a flowchart describing one embodiment of a method for implementing pattern matching logic to read an input to produce an output of pattern match results according to a state machine description.

Another aspect of the invention is an apparatus to carry out the pattern matching. FIG. 11 shows a simplified functional block diagram of an apparatus and FIG. 12 shows a flowchart operating in such an apparatus, in particular, a flowchart describing one embodiment of a method to instruct a single process or thread running a single state machine having an input 1101 to produce an output. A pattern matching method following this flowchart can be implemented in software running on a computer, or can be implemented in hardware on a dedicated machine to process the state machine, e.g., on an FPGA or ASIC. This method implements elements of 301 and 303 of FIG. 3.

Referring to FIG. 11, the pattern matching embodiment shown includes at least three elements: an input reader 1103 arranged to read each input, e.g., each octet of a sequence of inputs 1101, a state data reader 1109 arranged to read a particular state's state data from a pattern database 1107, and a state decoder and lookup engine 1105 arranged to decode the state data of the state and determine actions according to the read input octet and the state data. Such actions include the next state for the input, and any hit data. One embodiment further includes a result processor 1111 arranged to process any hit states. In an alternate embodiment, the hit data processing is carried out by separate logic, or, in the case of a method, by a separate process.

In one embodiment, several threads or processes can run simultaneously implementing one or more state machines described in a database.

FIG. 12 shows a flow chart describing a method that can be implemented by the elements of FIG. 11, or by a computer program. Assume there is a start state. The method maintains a current state, and includes in 1201 initializing its current state to a start state of a state machine, accepting, and decoding this first state. The method in loop 1203 carries out the blocks 1205, 1207, 1209, 1211, and 1213, as appropriate for each input of the input sequence. The method in 1205 reads an input from the input sequence and in 1207 the method determines (looks up) from the data for the current state which next state to transition to based on the current input. The method then transitions to the next state by setting the current state to that next state. One embodiment of block 1215 includes generating a next state request and reading the next state data from a database, e.g., database 1107 of FIG. 11. In 1209, this state data for the (new) current state is accepted and decoded. In 1211 the method ascertains whether or not the state is a hit state. If it is a hit state, in 1213 the state is processed as a hit state. In one embodiment, this processing in 1213 as a hit state includes carrying out a number of steps involving result processing. In another embodiment, processing as a hit state simply hands off the task to another process or machine. The method completes after all inputs of the input sequence have been processed One aspect of the invention provides for a single process or thread to apply multiple state machines to a single sequence of inputs to produce an output of pattern match results. The multiple machines correspond to a plurality of patterns, e.g., a plurality of regular expressions.

Another aspect provides for a multiple processes or threads applying the above-described method according to a state machine description represented in a pattern database. When all the processes or threads complete, the pattern match results of all these processes or threads produce an aggregate of pattern match results. This, more general aspect, can be used to implement the blocks 301 and 303 of the flow chart of FIG. 3. For example, pattern matching logic can set up four threads for any number of the state machines in the pattern database. The four threads are executed reading a single input and each thread produces an output of either no result in the case of no matches, or at least one pattern match result in the case that a hit state was reached. The results are combined to produce an aggregate of pattern match results ready for result processing.

Pattern Matching in Hardware

Figure 13:
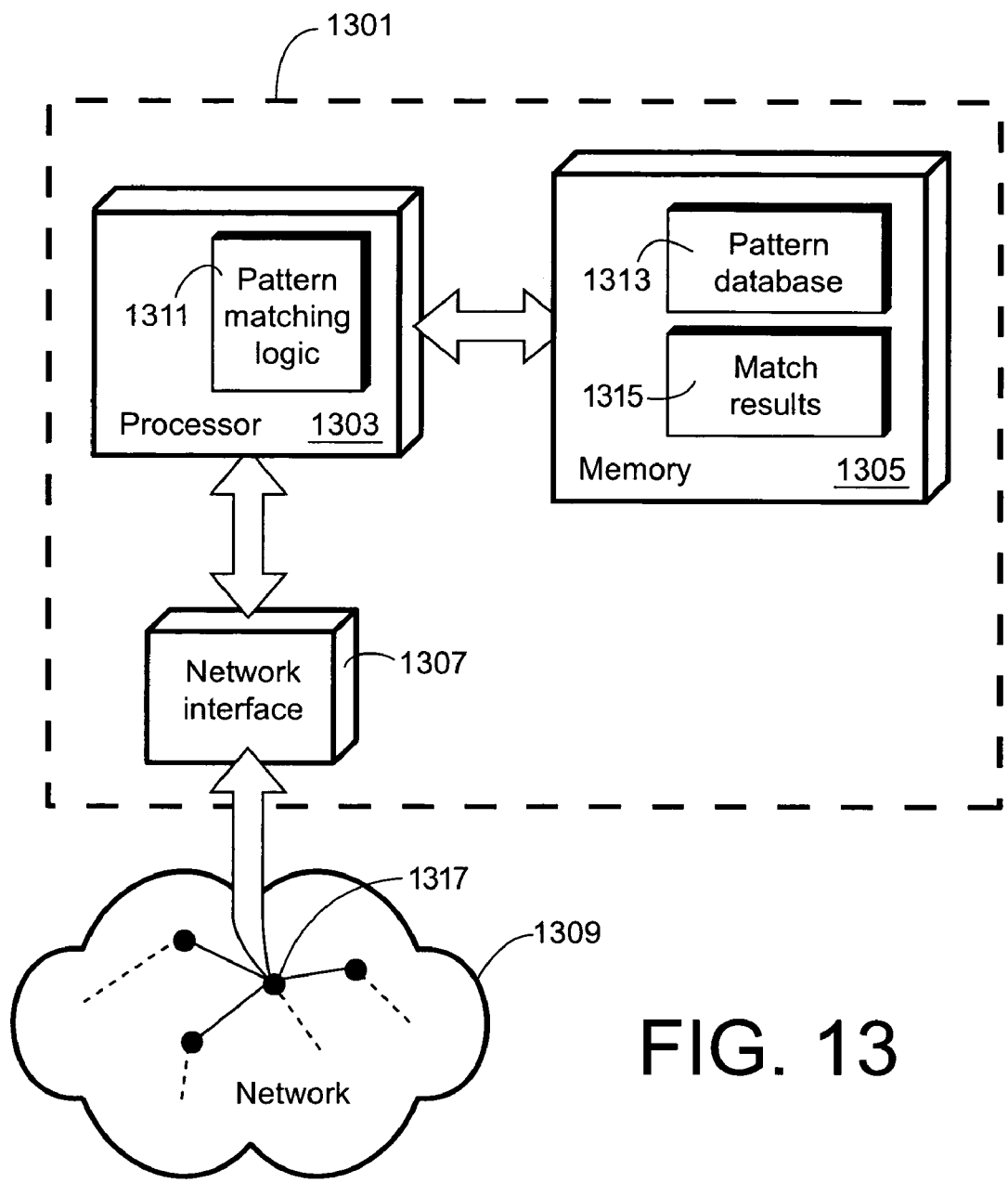
FIG. 13 shows one embodiment of an apparatus including pattern matching logic to read an input to produce an output of match results according to a state machine description stored in a pattern database.

FIG. 13 shows a simplified block diagram of one embodiment of an apparatus including pattern matching logic to read an input passing through a node of a network 1309 via a network interface 1307 to produce an output of match results according to at least one state machine stored in a pattern database. In one embodiment, several threads or processes can run simultaneously implementing one or more state machines described in a database.

The apparatus 1301 includes a pattern match processor 1303 coupled to a memory 1305. In one embodiment, the pattern match processor 1303 includes a pattern matching logic unit 1311 that includes aspects of the present invention. For example, such a pattern match processor can be implemented in an ASIC or in a network processor or in a FPGA (field programmable gate array). The memory 1305 is arranged to store, and thus includes, the pattern database 1313 and a storage space 1315 arranged to store match results. In one embodiment, the memory 1305 uses synchronous SRAM (SSRAM). The processor 1303 is further coupled to a network interface 1307, which is coupled to a network 1309. The apparatus 1301 is considered a node of the network 1309.

One or more packets transmitted over the network 1309 are received by the network interface 1307 coupled to a node 1317 of the network. The network interface provides packets to the pattern match processor 1303 as an input of data for processing. In one embodiment, the pattern matching logic implements operations substantially similar to those in the flowchart described in FIG. 3 using the pattern database 1313 and providing an output of zero, or at least one match result in 1315.

One aspect of the invention is that a number of processes or threads for state machine processing can operate simultaneously. In one embodiment, to fully utilize memory bandwidth of an SSRAM memory architecture, at least four processes or threads are simultaneously run one or more state machines represented in the pattern database 1313.

Note that in one embodiment, the pattern database 1313 is the pattern database 105 of FIG. 1. The information on the states of the state machine are in the form shown in FIG. 10 and include a structure of the form 1000 for each state, and a structure of the form 1050 for the next states of all the states. Using this data structure, the memory accesses may be interleaved such that, while the state structure of the form 1000 is looked up for where the next state information is in the data structure 1050 for the current state, the next state information for another state machine is retrieved from the memory in the structure 1050.

Figure 14:
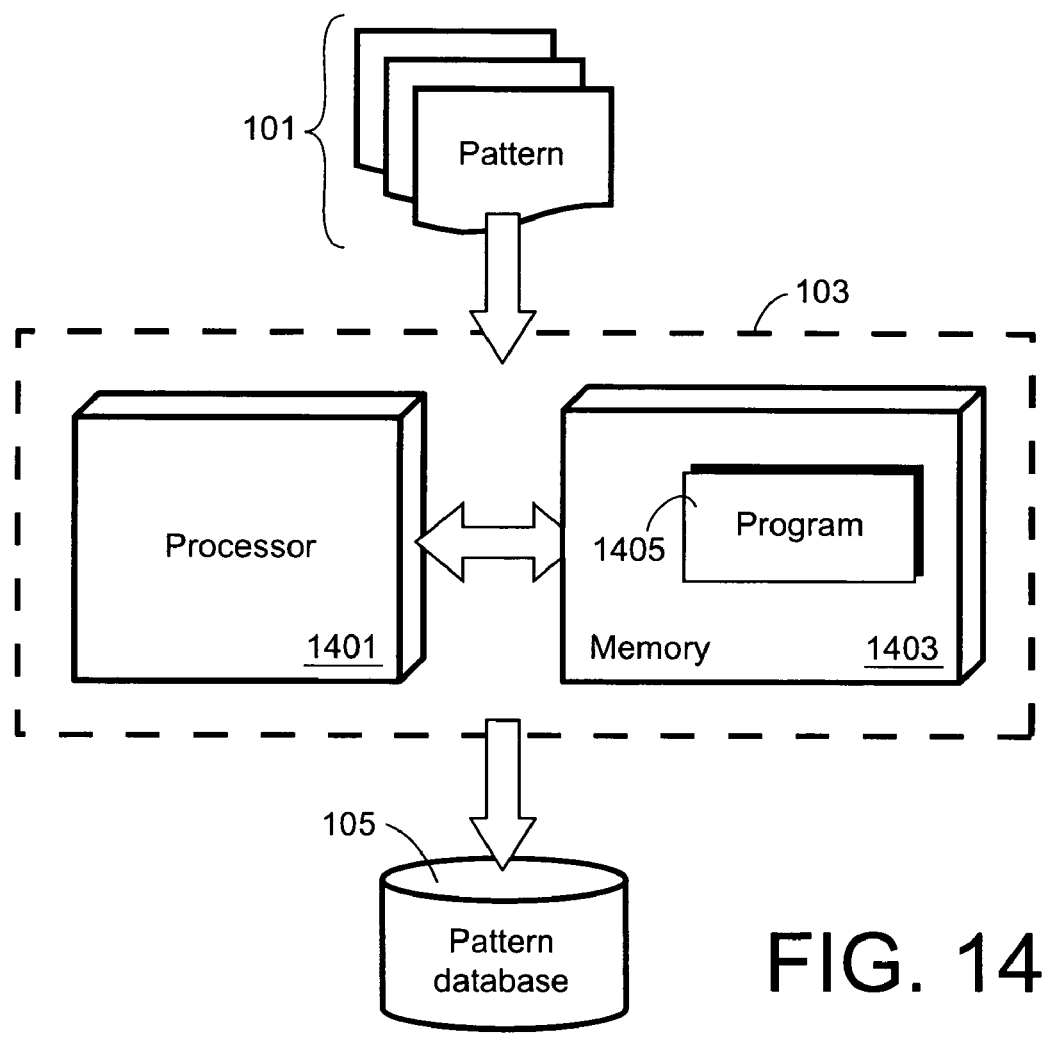
FIG. 14 shows one embodiment of a system that includes a carrier medium carrying instructions to cause a processor to implement a method for efficient pattern-to-state machine compiling and to implement a method for efficient state machine-to-pattern database generating.

Note that the multiple threads or processes whether in the processor or ASIC can be running the same state machine (DFA) or on different state machines (DFAs) simultaneously. For example, a plurality of threads or processes can be all be executing the same state machine (DFA) concurrently Programmable Processor Embodiments FIG. 14 shows a simplified block diagram of one embodiment of a pattern compiler and/or database generator in the form of a device 103 implementing a method to compile at least one pattern 101 into a pattern database 105. The device 103 includes a processor 1401 coupled to a memory 1403. One or more elements are in the form of computer readable code in the memory 1403, and are included in a computer readable code 1405 of memory 1403.

Figure 15:
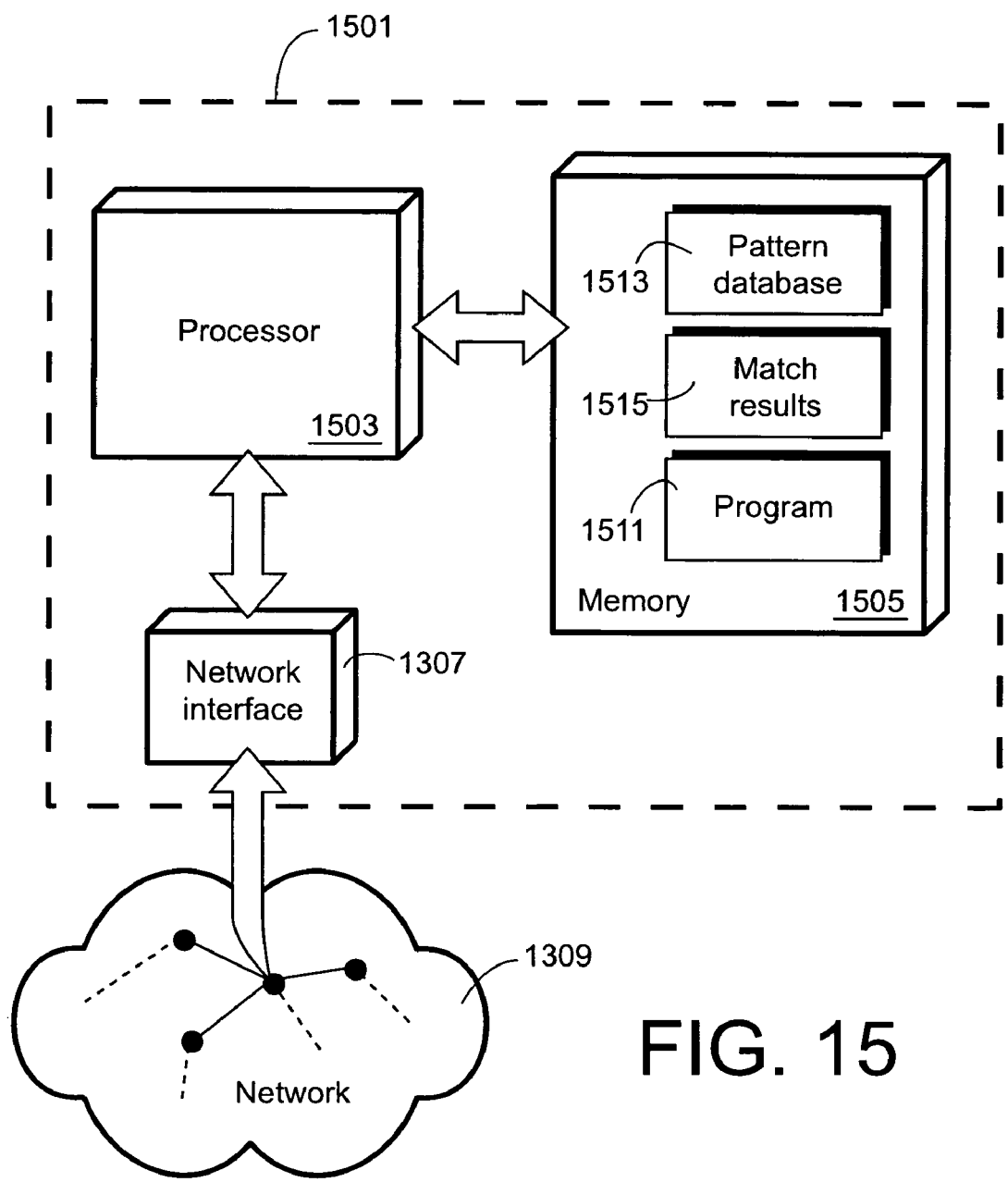
FIG. 15 shows one embodiment of a system that includes a carrier medium carrying instructions to cause a processor to implement a method to read an input to produce an output of match results according to a state machine description stored in a pattern database.

FIG. 15 shows a simplified block diagram of one embodiment of a device with pattern matching logic, wherein one or more elements are in the form of computer readable code in a memory coupled to a processor. A device 1501 implementing the pattern matching logic includes a processor 1503 coupled to a memory 1505. The one or more elements to implement the pattern matching logic are included in a computer readable code, e.g., a software program 1511 included in the memory 1505. The pattern matching logic reads input from a network interface 1307 that is coupled to the processor 1503 and a network 1309. The pattern matching logic acts according to at least one state machine according to information in a pattern database 1513 and produces an output of zero, or at least one pattern match results 1515. In one embodiment, these correspond to the database 105 and match results 111, respectively.

Another aspect of the invention is in the form of a carrier medium carrying computer readable data that forms a database of patterns obtained using one or more of the methods described herein, representing, for example, merged patterns each described using a regular expression, and merged into the data for a single state machine.

Performance Comparisons and Hybrid Methods

The aspects described above can be combined to form what is called a hybrid method herein.

For example, the description in the database of state 0 may be using state aggregation. The description of all states other than state 0 may use state 0 mapping. Each state's data structure may include bit aggregation.

FIG. 16 and FIG. 17 show performance comparisons of a prior art method compared to some embodiments of hybrid methods.

One hybrid method, identified as "Without Subpattern Generation" in FIGS. 16 and 17, includes aspects of state machine merging into a single state machine, but not subpattern generation to split up patterns into subpatterns. Another hybrid method, identified as "With Subpattern Generation" includes aspects of both state machine merging into a single state machine and subpattern generation. Another hybrid method, identified as "With Subpattern Generation Plus" includes aspects of both state machine merging and subpattern generation, wherein the state machine merging merges into a relatively large number of state machines, e.g., about 50 in the examples used to produce FIGS. 16 and 17.

FIG. 16 shows a computational time complexity diagram showing the performance of a prior art method, a merged pattern method and a separated pattern method as measured in a "real-world" test using implementations of the methods described above. Note that the "Without Subpattern Generation" method performs exponentially as the total number of patterns increases. The "With Subpattern Generation" performs approximately linearly to the number of patterns provided to the method. The "With Subpattern Generation Plus" performs more closely to a linear variation with the number of patterns provided.

FIG. 17 shows a state size complexity diagram showing the performance of a prior art method, a merged pattern method and a separated pattern method as measured in a "real-world" test using implementations of the methods described above. Note again that the "Without Subpattern Generation" method performs exponentially against the total number of patterns. The "With Subpattern Generation" and the "With Subpattern Generation Plus" methods both perform roughly linearly to the number of patterns provided to the methods. The "With Subpattern Generation" performs slightly better as the method of merging into a single state machine provides many iterations of state optimization.

Thus, several method embodiments, apparatus embodiments, and embodiments of carrier media that include machine readable data have been presented.

Note that the term complex when applied to an expression has the same meaning as complicated.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or logic, or similar electronic device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that form pattern match logic. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
accepting a sequence of inputs corresponding to packets passing in a computer network;
searching the input sequence for the plurality of patterns;
wherein the pattern patching logic is formed by a process including:
   accepting or determining a plurality of state machines for searching for the plurality of patterns describable by expressions in a pattern description language;
   merging the state machines to form a merged state machine; and
   storing a data structure describing the merged state machine, including state data on the states of the merged state machine,
such that the pattern matching logic reading state data can search the input sequence for the plurality of patterns.

2. A method as recited in claim 1, wherein the patterns of the plurality are describable as regular expressions, such that the accepting or determining of the plurality of state machines includes accepting a plurality of regular expressions for the plurality of patterns.

3. A method as recited in claim 2, wherein the accepting or determining of the plurality of state machines includes determining at least one NFA.

4. A method as recited in claim 3, wherein the accepting or determining of the plurality of state machines further includes converting each NFA to a DFA.

5. A method as recited in claim 4, wherein the merging the state machines to form a merged state machine includes:
   forming a merged NFA; and
   converting the merged NFA to a merged DFA.

6. A method as recited in claim 1, further comprising:
compressing a representation of the merged state machine into the data structure, the compressing using for a particular state one of the set consisting of:
   state aggregation that includes in the data for the particular state a reference next state for the particular state, a shortened list of next state information on only those next states of the particular state that are other than the reference next state, and a map of which next states are included in the shortened list; and
   base-state mapping that includes in the data of the particular state a shortened list of next state information on only those next states of the particular state that are different from the corresponding next states of a base state, and a map of which next states are included in the shortened list.

7. A method comprising:
accepting one or more patterns describable by a pattern description language for logic to search for the patterns in packets passing in a computer network, the logic using a state machine corresponding to the one or more patterns; and
compressing data representing the state machine corresponding to one or more patterns, each pattern describable by a pattern description language, the compressing comprising:
   for a particular state of the state machine that has a set of next states for different inputs of an alphabet of inputs, forming a compressed representation of the particular state using one of the set of method consisting of:
state aggregation that includes in the compressed representation for the particular state a reference next state for the particular state, a shortened list of next state information on only those next states of the particular state that are other than the reference next state, and a map of which next states are included in the shortened list; and
base-state mapping that includes in the compressed representation of the particular state a shortened list of next state information on only those next states of the particular state that are different from the corresponding next states of a base state, and a map of which next states are included in the shortened list.

8. An apparatus comprising:
a pattern converter configured to accept a plurality of patterns and to convert the accepted patterns into at least one pattern data structure representing at least one state machine,
a database generator coupled to the pattern converted and configured to transform the at least one data structure to a pattern database defining at least one state machine,
such that pattern matching logic can use the pattern database to implement the at least one state machine defined by the pattern database.

9. An apparatus comprising:
pattern matching logic configured to accept an input, and implement at least one state machine defined by a pattern database determined from a plurality of patterns, the pattern matching logic further configured to produce an output that includes any pattern match results corresponding to any matches in the input to any of the plurality of patterns,
wherein the pattern database is determined by accepting the plurality of patterns and converting the accepted patterns into at least one pattern data structure representing the at least one state machine, and generating the pattern database from the into at least one pattern data structure.

10. An apparatus as recited in claim 9, wherein the pattern matching logic is implemented as code executable on a programmable processor.

11. A method comprising:
(a) accepting a plurality of input patterns for logic to search for the patterns in packets passing in a computer network, the logic using a pattern database; and (b) transforming the plurality of input patterns into the pattern database, the transforming including:
converting a plurality of patterns into at least one data structure representing at least one state machine; and
transforming the at least one state machine into the pattern database.

12. A method as recited in claim 11, wherein the at least one state machine are in the form of at least one DFA.

13. A method as recited in claim 11, wherein each unique pattern is identified by a unique pattern ID usable by pattern matching logic to determine which pattern of the patterns generated a match.

14. A method as recited in claim 11, wherein (b) further includes:
splitting each pattern of the plurality of patterns into at least one subpattern.

15. A method as recited in claim 14, wherein (b) further includes:
determining for each subpattern a corresponding state machine in a form of the set consisting of a DFA and an NFA; and
merging the determined state machines to a set of a relatively small number of state machines, wherein the relatively small number is one or more.

16. A method as recited in claim 15, wherein the determining of a state machine for each subpattern determines a NFA, the method further comprising:
prior to the merging, transforming the NFA of each subpattern into a corresponding DFA.

17. A method as recited in claim 15, wherein the merging includes:
merging the state machines for each subpattern into the relatively small number of state machines, each in the form of a merged NFA; and
transforming the at least one merged NFA to at least one merged DFA.

18. A method as recited in claim 14, wherein the splitting of a particular pattern includes one or more of:
splitting at any alternations in the particular pattern; and
splitting at multiple any matches.

19. A method as recited in claim 14, wherein each unique pattern is identified by a unique pattern ID usable by pattern matching logic to determine which pattern of the patterns generated a match, and wherein the splitting of a particular pattern includes generating a subpattern ID for use by the pattern matching logic to determine the pattern ID of the particular pattern that is associated with a particular match from a state machine created from a subpattern.

20. A method as recited in claim 19, wherein the part of the pattern database that describes a particular state machine includes a representation of the states of the state machine, an indication of those states that are hit states, and for each particular state, a representation of the next states of the particular state of the particular state machine, a representation of paths from the particular state to the next states of the particular state.

21. A method as recited in claim 20, wherein the transforming of the at least one state machine into a pattern database includes:
for a particular state of the state machine that has a set of next states for different inputs of an alphabet of inputs, forming a compressed representation of the particular state using one of the set of methods consisting of:
a state aggregation method that includes providing a reference next state, and that further includes providing in the compressed representation for the particular state, a shortened list of next state information on only those next states of the particular state that are other than the reference next state, and a indication of which next states are included in the shortened list; and
a base-state mapping method that includes providing a base state, and that further includes providing in the compressed representation of the particular state a shortened list of next state information on only those next states of the particular state that are different from the corresponding next states of a base state, and a indication of which next states are included in the shortened list,
such that forming the compressed representation includes providing a reference structure that is a reference next state in the state aggregation method, and a base state in the base-state mapping method, that that includes providing in the compressed data structure a shortened list of information items, an indication of which information items in a particular list are different from corresponding items in the reference structure, and providing information how such different items differ.

22. A method as recited in claim 21, wherein the indication of which information items in the particular list are different includes a list map, and wherein the information on how the items differ is a shortened list for the particular list.

23. A method as recited in claim 22, wherein the list map is in the form of a list of binary-valued information for each item location in the particular list to indicate whether or not the information item at the item location differs from that in the reference structure.

24. A method as recited in claim 23, wherein the list map is compressed by bit aggregation that includes an indication only of those items in the list map that differ from a reference list map, and an indication of how the items in the list map differ.

25. A method as recited in claim 23, wherein list map is in the form a list of bits, and wherein the list map is compressed by bit aggregation that includes partitioning the list map into a first number of subfields of a second number of bits, such that the compressed list map includes an indication of those subfields that are identical to a reference subfield, and a shortened list of those subfields that are not the same as the reference subfield.

26. A method as recited in claim 20, wherein the part of the pattern database that describes a particular state machine uses differential encoding of information for a particular state that indicates differences of the information for the particular state from the corresponding information for a reference state.

27. A method as recited in claim 20, wherein the transforming of the at least one state machine into a pattern database includes:
providing a reference data structure for the reference state, and
creating a shortened data structure that includes data on information items not provided in the reference data structure, and an indication to indicate which information items are included in the shortened data structure, and which values are obtained by referring to the reference data structure.

28. A method as recited in claim 27,
wherein the data included in the shortened data structure includes the information items not provided in the reference data structure.

29. A method as recited in claim 27,
wherein the data included in the shortened data structure includes differences for the information items not provided in the reference data structure from the corresponding information items in the reference data structure.

30. A method as recited in claim 27,
wherein the indication indicating which information items are included in the state data structure is in the form of list map of binary-valued information.

31. A method as recited in claim 11, wherein the transforming of the at least one state machine into a pattern database creates a relatively compact pattern database from the at least one data structure representing the at least one state machine.

32. An apparatus comprising:
pattern matching logic configured to accept an input and to accept information on a present state of a state machine defined by a pattern database determined from a plurality of patterns, the pattern matching logic further configured to implement for the accepted present state the state machine defined by the pattern database, and configured to produce an output that includes any pattern match results corresponding to any matches in the input to any of the plurality of patterns,
wherein the pattern database is determined from the plurality of patterns by accepting the plurality of patterns and converting the accepted patterns into at least one pattern data structure representing at least one state machine.

33. An apparatus as recited in claim 32, wherein the pattern matching logic is implemented as code executable on a programmable processor.

34. An apparatus as recited in claim 32, wherein the data structure for a state machine is configured so that pattern matching logic can look up the next state for the present state in high-speed.

35. An apparatus as recited in claim 34, wherein the data structure for the state machine is configured so that the pattern matching logic can carry out a next state look up for the next in no more than two reads in order to obtain the next state information for the present state.

36. An apparatus as recited in claim 35, wherein information for any state in the data structure includes one or more next state pointers, and wherein the data structure includes a first data structure that stores all the next state pointers that point from any state of the state machine, such that the first data structure includes next state data for each path in the state machine to a next state for every state of the state machine.

37. An apparatus as recited in claim 36, wherein each entry in the first data structure includes a next state pointer, and also, for the particular next state pointed to by the next state pointer, a field whose contents indicate whether or not the particular next state is a hit state, and, in the case of a hit state, information on any pattern matched, and an identifier for such pattern,
such that a single read of the first data structure provides the pointer for the particular next state, an indication whether the particular next state is a hit state, and if the particular next state is a hit state, information on patterns matched.

38. An apparatus as recited in claim 37, wherein for each state of the state machine for the patterns being searched by the state machine, there is a second data structure that includes information indicative of the location in the first data structure of a list of next state pointers for the state,
such that for the present state of a state machine, the second data structure provides a way to determine from an input, which next state pointer in the first data structure is applicable to the input.

39. An apparatus as recited in claim 38, wherein the data structure that includes the first and second data structures uses base state mapping for any state, such that for any state other than a base state, there is a shortened list of next state pointers in the second data structure, and a list map to indicate which next state pointers are different from hose for the vase state.

40. An apparatus as recited in claim 39, wherein the list map is included in the second data structure and contains binary-valued information.

41. An apparatus as recited in claim 40, wherein, for any state other than the base state, the list map is split into a first number of subfields such that in each subfield that is different from a reference sub field, the location of the binary-valued information in the subfield that is different from the reference subfield provides an indication for a next state pointer in the first data structure.

42. An apparatus as recited in claim 38, wherein the first data structure of next states contains a sequential set of entries for a sequential subset of the shortened list of next states pointers for the state.

43. An apparatus as recited in claim 42, wherein the first data structure is in a compressed form such that sequences of one or more next state pointers that appear for more than one state need appear only once in the first data structure.

44. An apparatus as recited in claim 43, wherein the first data structure is compressed by a method that includes, during or after construction of the first data structure, for any particular sequence of next states pointed to by a start pointer in the second data structure, searching the first data structure to ascertain if the particular sequence of next states already exists in the first data structure.

45. An apparatus as recited in claim 35, wherein the data structure includes:
a first data structure of next states that includes lists of next states for different states; and
for each state, a second data structure that includes pointers to the start of a next state list for that state in the first data structure,
such that at any state, a single read of an entry of the second data structure together with the input provides information to determine which entry to read for the next state in the first data structure, and such that a single read of the first data structure provides the information for the next state in the first data structure.

46. An apparatus comprising:
an input reader arranged to read each input;
a state data reader arranged to read a particular state's state, state data from a pattern database; and
a state decoder and lookup engine arranged to decode the state data of the state and determine actions according to the read input and the state data.

47. An apparatus as recited in claim 46,
wherein the actions determined according to the read input and the state data include the next state for the input, and any hit data for any hit states.

48. An apparatus as recited in claim 46, further comprising:
a result processor arranged to process any hit states.

* * * * *

UNITED STATES PATENT AND TRADEMARK OFFICE
CERTIFICATE OF CORRECTION

PATENT NO. : 7,260,558 B1
APPLICATION NO. : 11/257485
DATED : August 21, 2007
INVENTOR(S) : Paul C. Cheng and Fangli Chien Page 1 of 1

It is certified that error appears in the above-identified patent and that said Letters Patent is hereby corrected as shown below:

IN THE CLAIMS:

Column 33, line 31, claim 1, change "patching" to --matching--.

Signed and Sealed this
First Day of October, 2013

Teresa Stanek Rea
*Deputy Director of the United States Patent and Trademark Office*